April 3, 1956     F. C. CHOICE ET AL     2,740,144
TOE LINING TRIMMING MACHINES
Filed Oct. 8, 1954     21 Sheets-Sheet 1

Inventors
Frank Coleman Choice
John William Pratt
By their Attorney
Thomas J. Ryan.

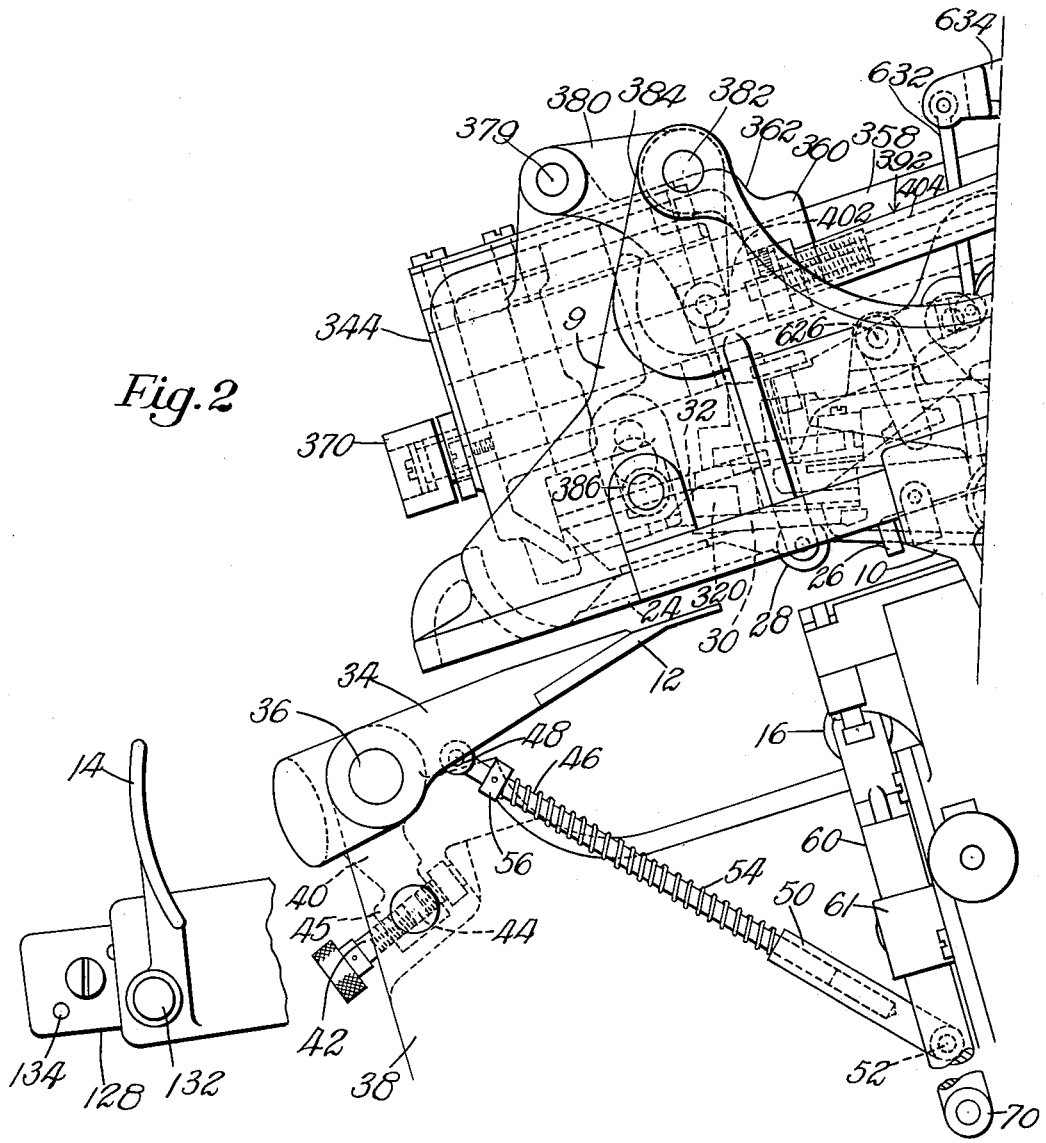

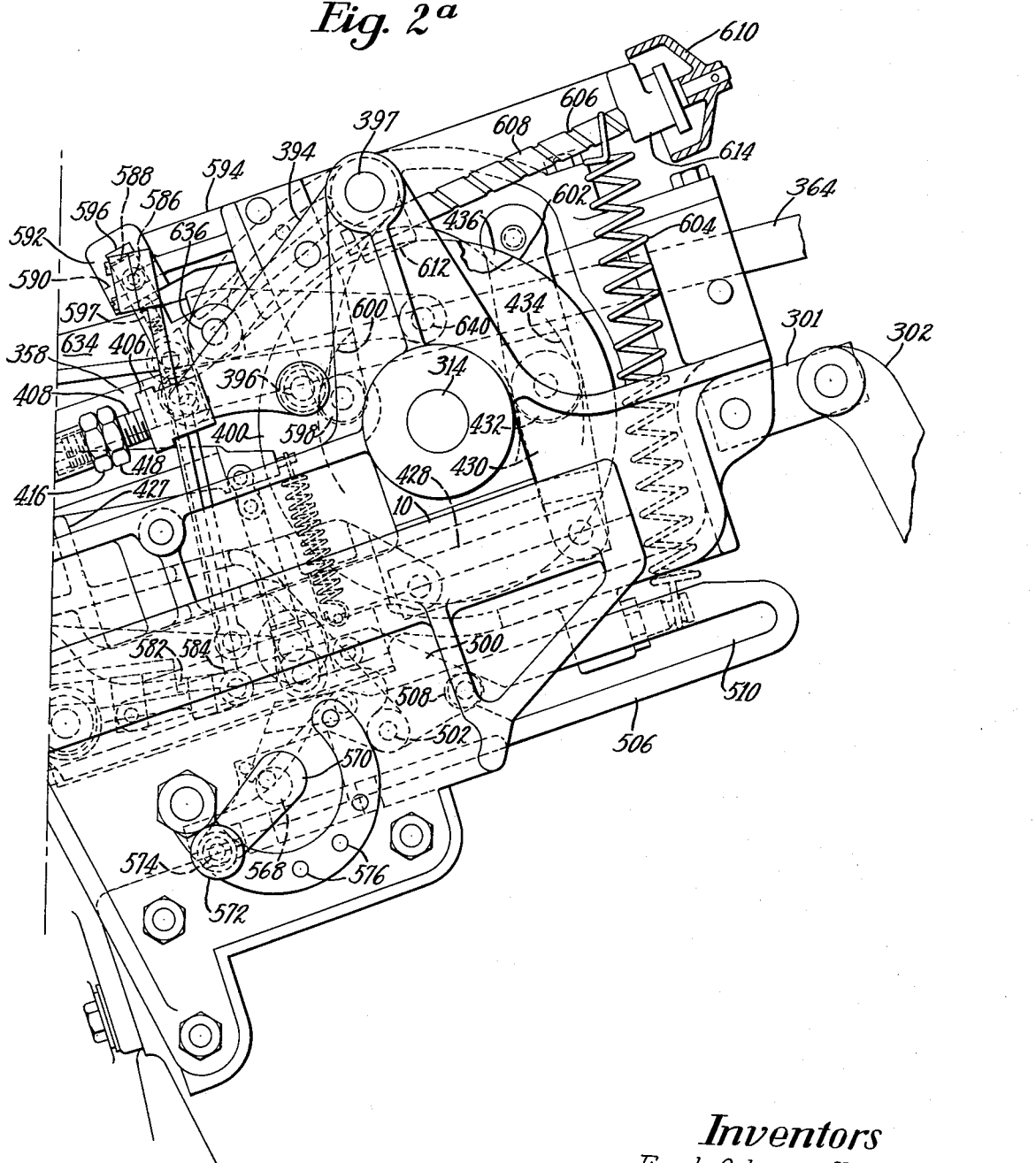

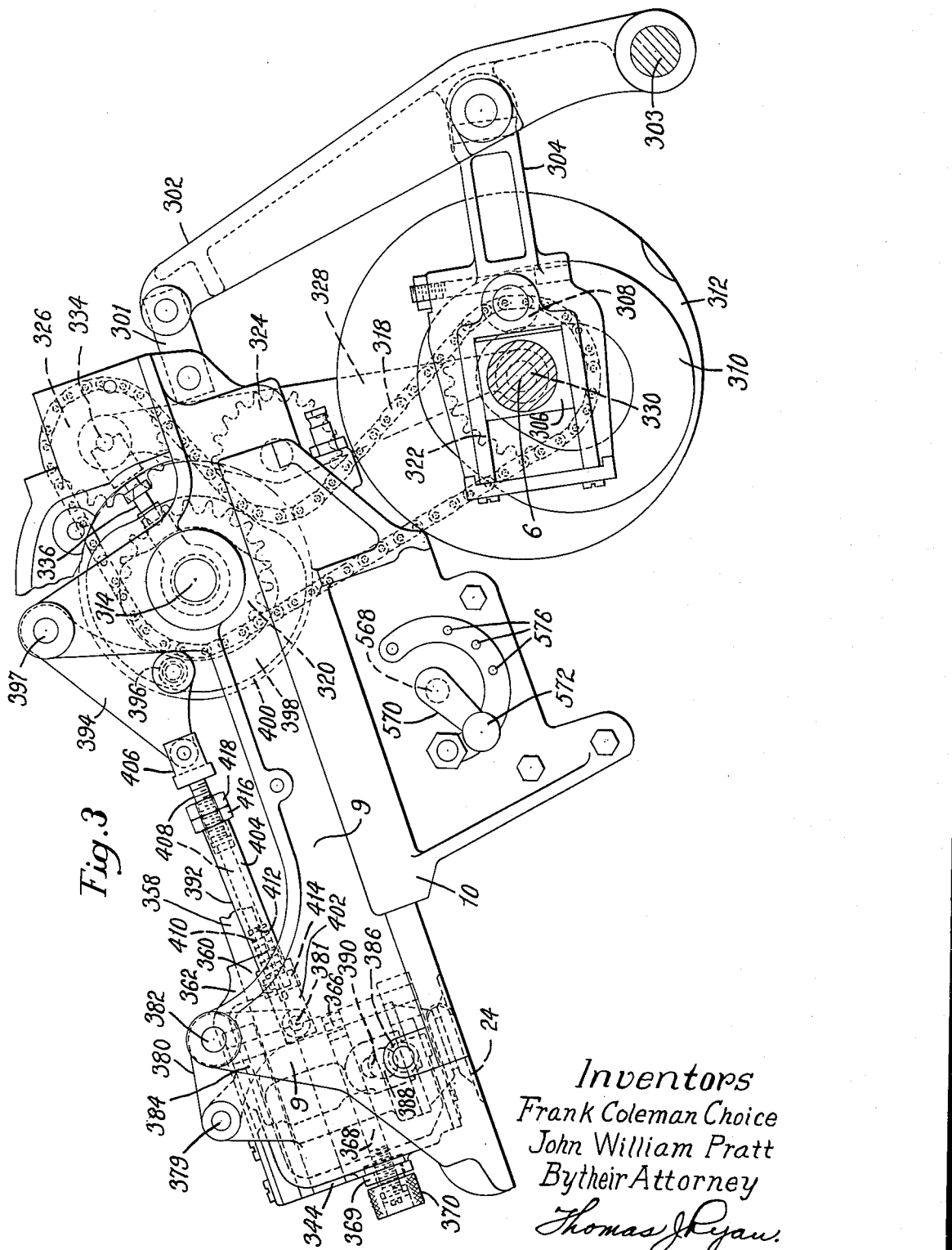

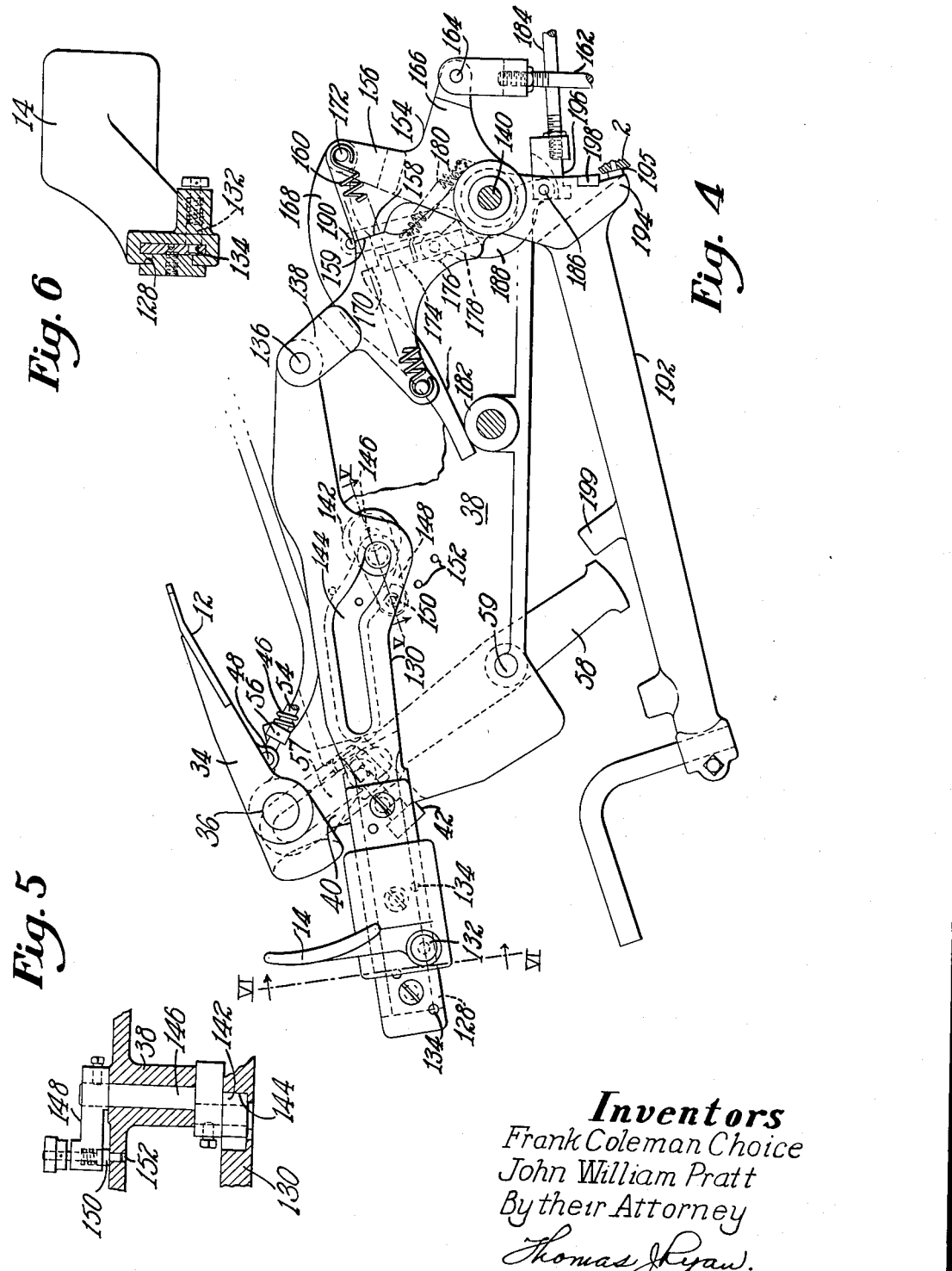

Inventors
Frank Coleman Choice
John William Pratt
By their Attorney
Thomas J. Ryan Inventors
Frank Coleman Choice
John William Pratt
By their Attorney
Thomas J Ryan April 3, 1956 F. C. CHOICE ET AL 2,740,144
TOE LINING TRIMMING MACHINES
Filed Oct. 8, 1954 21 Sheets-Sheet 11

Inventors
Frank Coleman Choice
John William Pratt
By their Attorney
Thomas J. Ryan

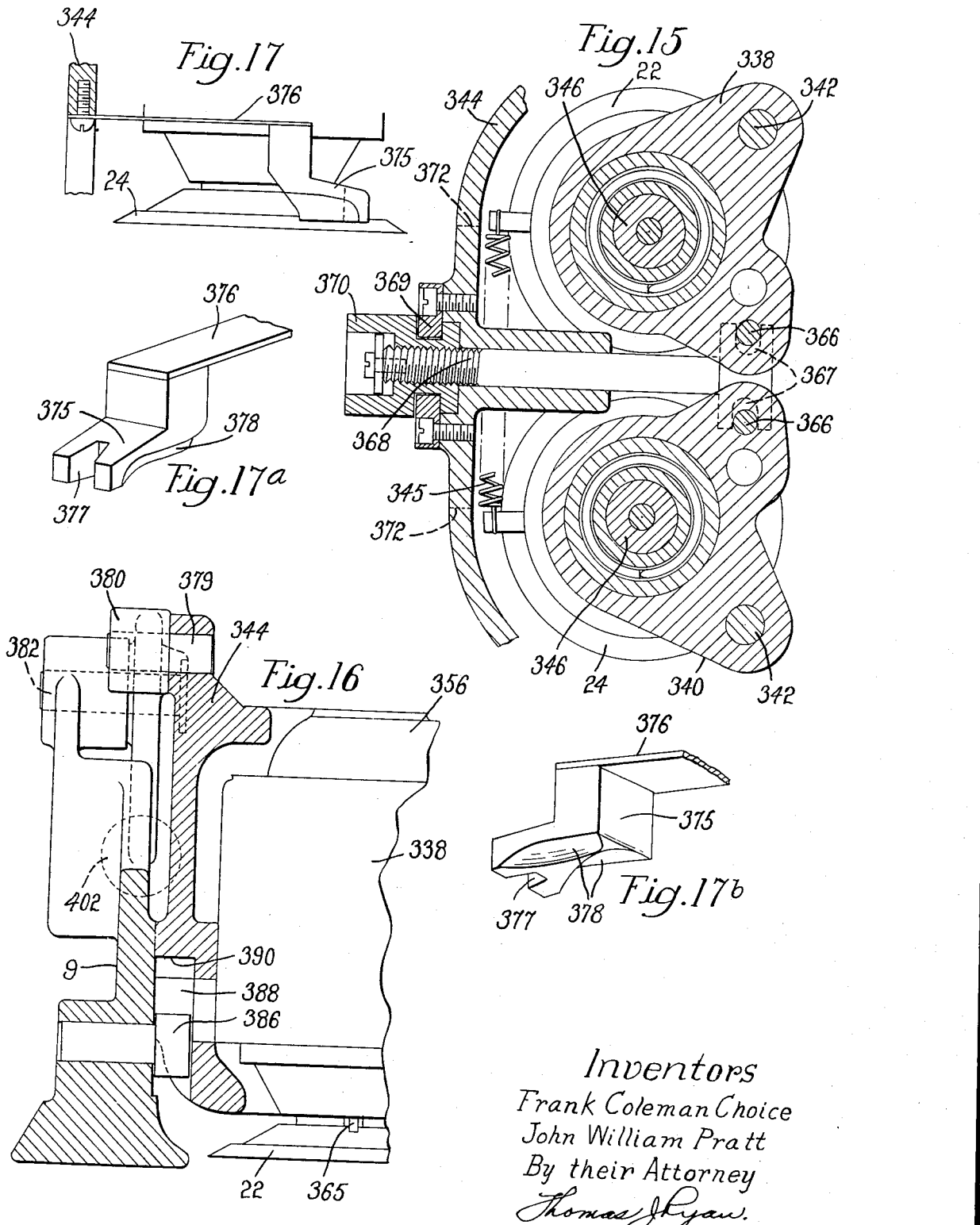

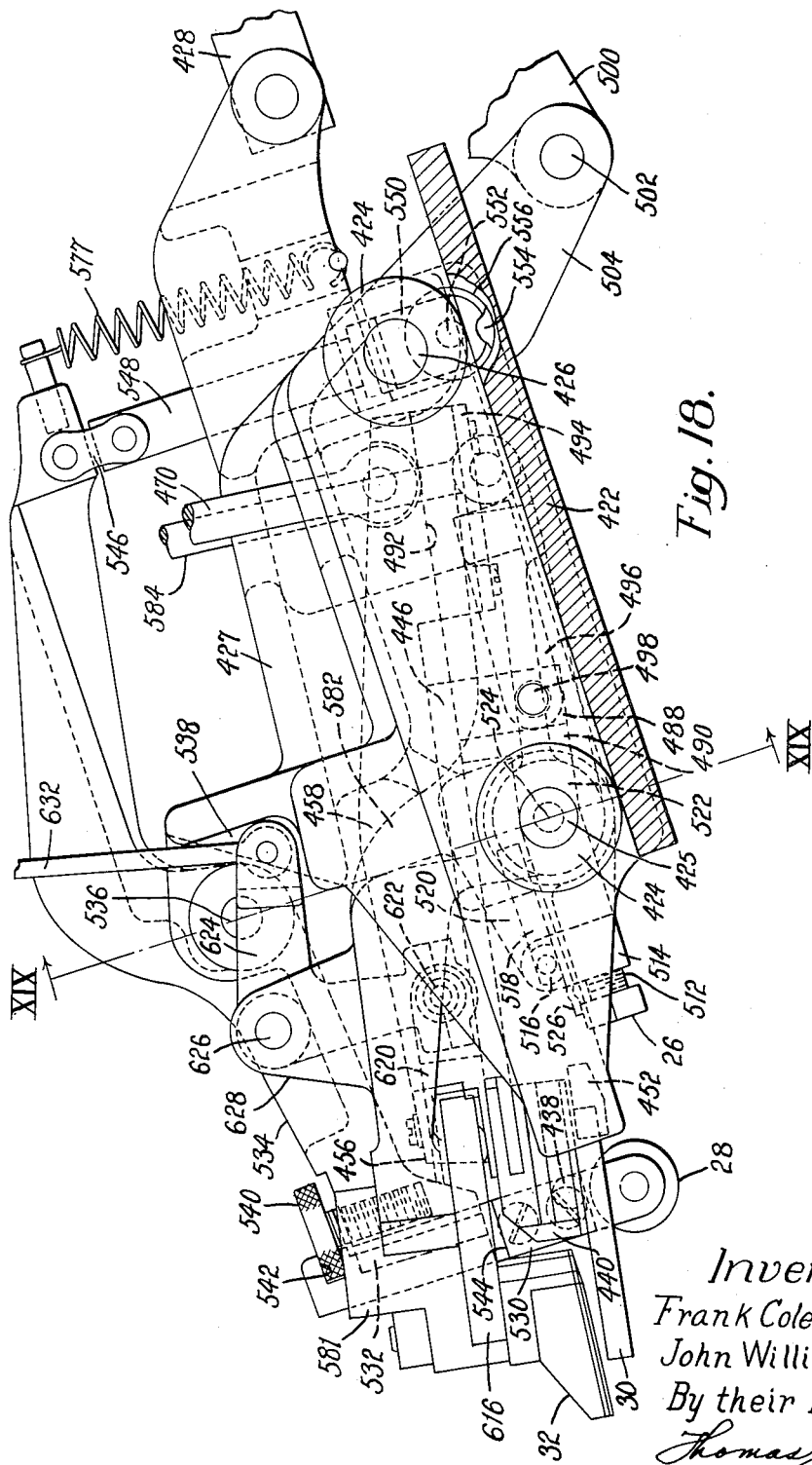

April 3, 1956

F. C. CHOICE ET AL 2,740,144

TOE LINING TRIMMING MACHINES

Filed Oct. 8, 1954

Inventors
Frank Coleman Choice
John William Pratt
By their Attorney
Thomas J. Ryan.

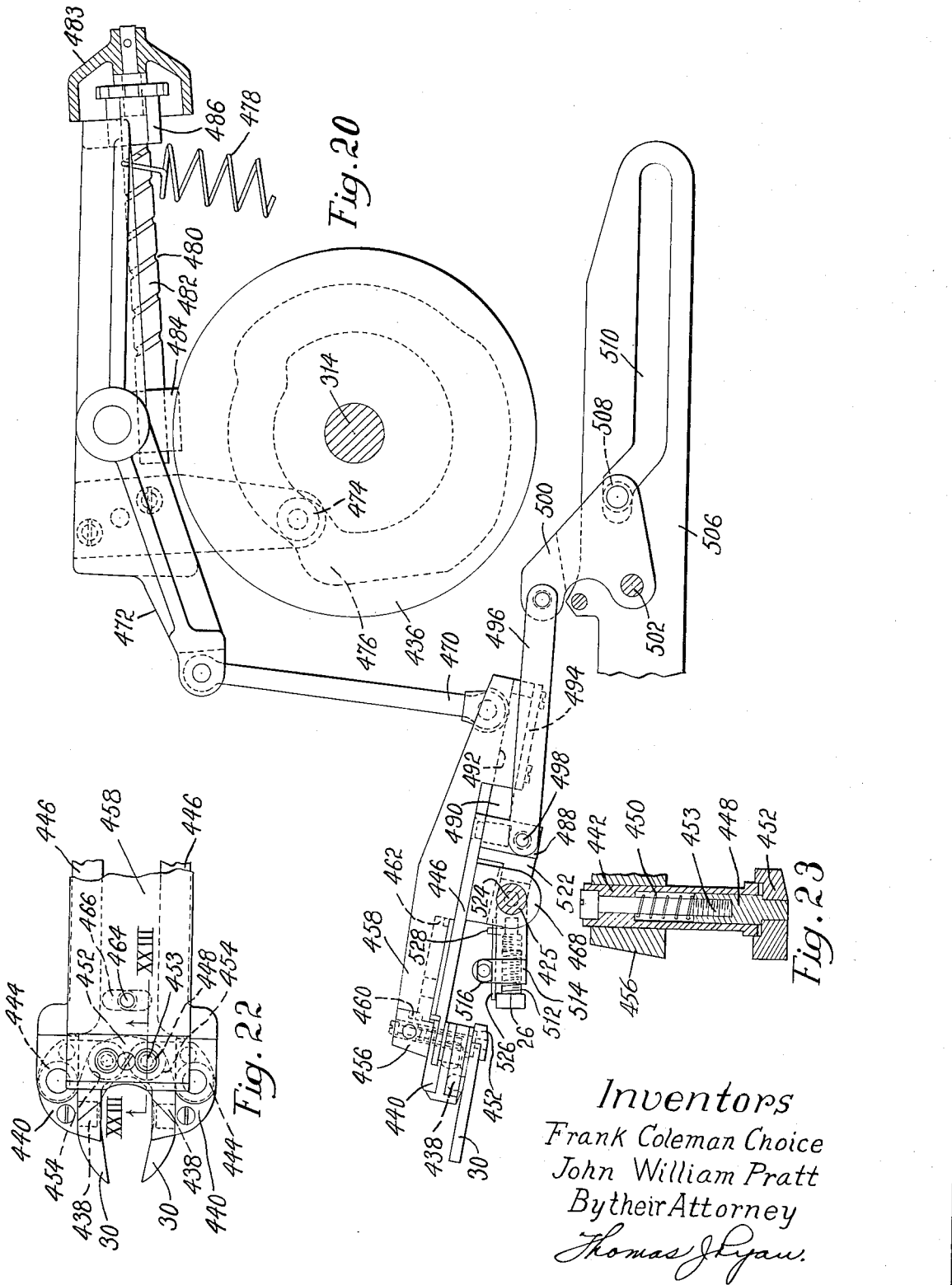

Inventors
Frank Coleman Choice
John William Pratt
By their Attorney
Thomas J. Ryan

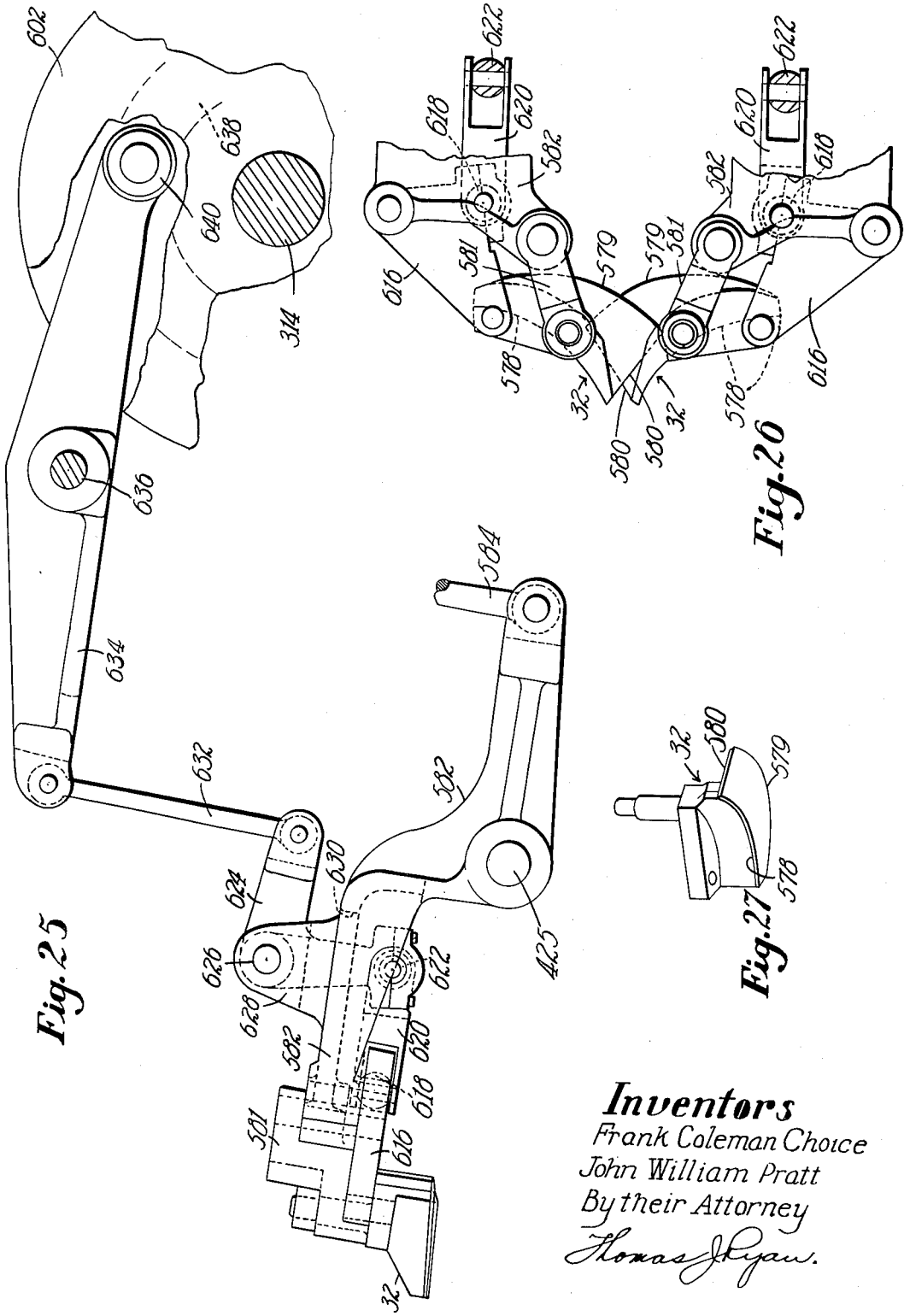

Inventors:
Frank Coleman Choice
John William Pratt
By their Attorney
Thomas J Ryan April 3, 1956   F. C. CHOICE ET AL   2,740,144
TOE LINING TRIMMING MACHINES
Filed Oct. 8, 1954   21 Sheets-Sheet 19

Inventors:
Frank Coleman Choice
John William Pratt
By their Attorney
Thomas J. Ryan

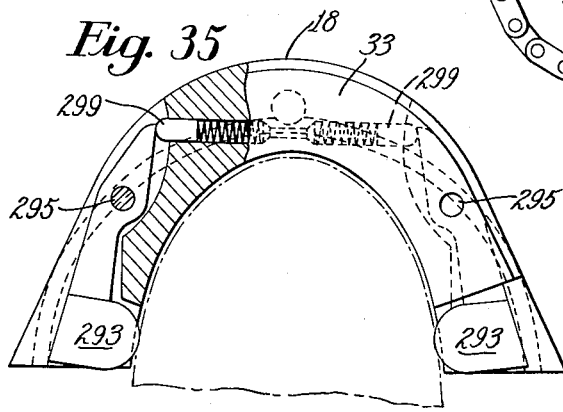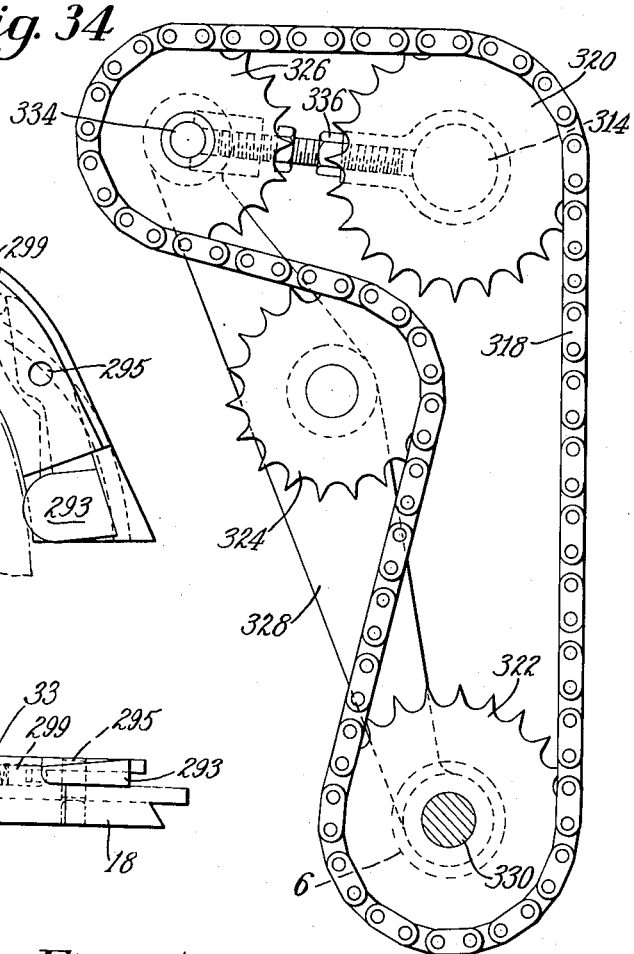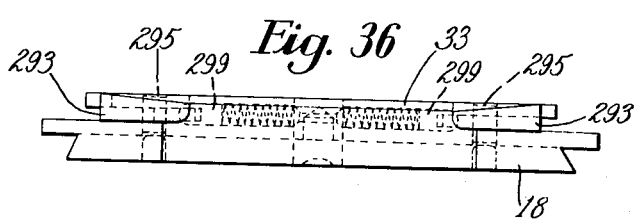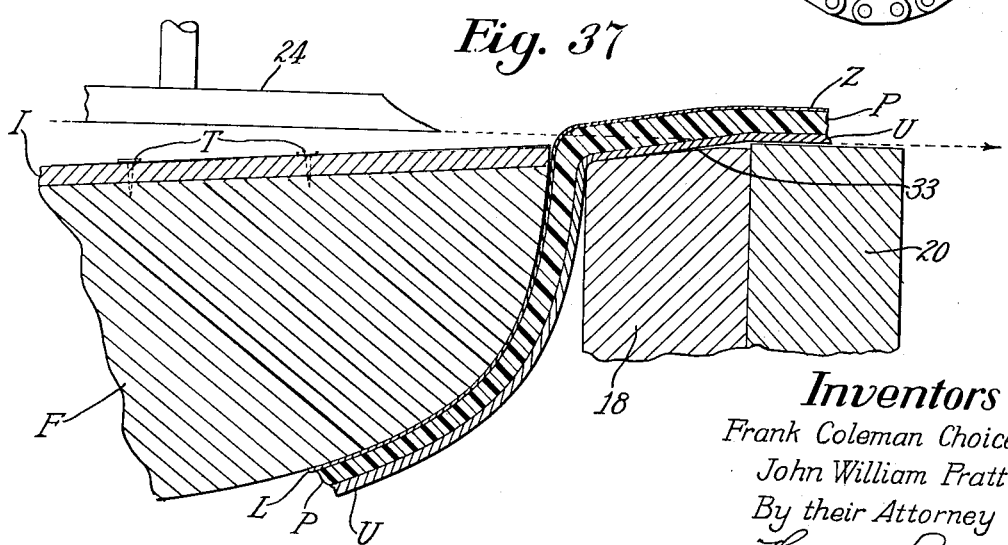

United States Patent Office 2,740,144
Patented Apr. 3, 1956

2,740,144
TOE LINING TRIMMING MACHINES

Frank Coleman Choice and John William Pratt, Leicester, England, assignors to United Shoe Machinery Corporation, Flemington, N. J., a corporation of New Jersey Application October 8, 1954, Serial No. 461,202

Claims priority, application Great Britain November 3, 1953

15 Claims. (Cl. 12—57.6)

This invention relates to trimming machines and is illustrated herein as applied to a machine for trimming surplus upper materials at the toe portion of a partially fabricated shoe. The surplus materials include parts of the box toe, the lining, upper leather, and sometimes a doubler.

The purpose of the trimming operation is to facilitate the subsequent lasting of our upper material, such as leather, to the insole by eliminating unnecessary lining material which would otherwise result in an undesirable bulk between the upper leather and the insole. The illustrative machine is a toe lining trimming machine of the type disclosed in United States Letters Patent No. 2,466,798, issued April 12, 1949, on an application of H. E. Elliott et al. and United States Letters Patent No. 2,556,410, issued June 12, 1951, on an application of W. A. Barker.

It has been found that with certain kinds of upper leather and with certain shapes of lasts, shoes trimmed on machines disclosed in the above-mentioned patents, and thereafter subjected to a toe lasting operation, show, on occasion, wrinkling of the upper leather around the feather line where it will be visible in the finished shoe. This wrinkling is attributable, in part at least, to disconformities between the extent and nature of the stretching of the upper materials which takes place in the trimming machine and the extent of the stretching which thereafter takes place in a toe lasting machine.

One object of the invention, therefore, is to provide a machine for trimming surplus portions of shoe upper materials which will stretch these upper materials during the trimming operation in a manner similar to the stretching which takes place in the subsequent toe lasting operation so that undesirable wrinkling of the upper leather is eliminated in the lasted shoe.

The operations prior to the trimming operation include side lasting of the upper leather as far forward as the tip line of the shoe and the removal of pulling-over tacks from the toe portion ahead, i. e., toeward of that line. The upper leather previously pulled over and held to the last by the pulling-over tacks often is longer than required in the subsequent lasting operation.

Another object of the invention is to provide means for trimming the toeward marginal portion of the upper leather to the length required for subsequent toe lasting, as well as for severing surplus toe lining material to reduce its bulk.

A third object of the invention is to provide means, first to conform the upper materials of the toe of a shoe, including the lining, box toe, and upper leather to the last, and then to spread outwardly over a cutting matrix marginal portions of these upper materials, while stretching the materials over the last, and finally to trim excess portions of the box toe and lining severing the upper leather at a length required for subsequent toe lasting, the trimming operation taking place while the upper materials are under tension.

In using machines of the type disclosed in the above-mentioned patents it has been found difficult to trim the surplus materials in the area immediately toeward of the tip line. The upper material on the sides of the shoe heelward of the tip line has been side lasted, and the upper material toeward of the tip line (unlasted at this stage of the operation) must be spread outward away from the last over a trimming matrix to expose and support margins of the box toe and lining for trimming. Consequently, at the tip line there is an area where there is a fold in the upper materials. This fold takes place over the bottom of the last, and there is no support for the material constituting the fold when it is trimmed, since the trimming matrix surrounds the last on the outside.

Another object of the invention is to provide means for supporting, during trimming, that portion of the upper material at the tip line of the shoe where the unlasted toe portions of the upper materials overlie the side lasted portions in a fold.

In the patented machines there exists clamping mechanisms for positioning a shoe bottom upward to be trimmed. However, if the machines are started without a shoe in operating position, the upper material spreading means and the trimming knives come directly in contact with upward moving parts of the wiper mechanism and serious damage results.

Another object of the invention is to provide a machine having interlocking safety means associated with the shoe clamping mechanism whereby the operating mechanisms can not be started without a shoe in proper working position.

The illustrative machine hereinafter described is generally similar in principle to the toe lining trimming machines disclosed in the above-mentioned patents to Barker and Elliott et al., in that it has clamping means including a bottom plate and an insole roll against which a shoe on a last is held inverted by a heel abutment and a toe rest. There is a matrix over which the toe portion of the lasting margins of the upper materials are spread and rotating knives which, in cooperation with a shearing block, trim the toe portions of the lining and the box toe and sever the upper leather to a predetermined length. However, the illustrative machine has toe spreaders which not only act to spread marginal portions of the upper materials over the matrix, but also cooperate with an upwardly moving wiper plate, pressing the upper materials against the wiper plate as the latter moves heightwise of the shoe, thus enabling the wiper plate to conform the upper materials to the toe portion of the last and stretch them during the trimming operation.

The illustrative machine is also provided with particularly simple and convenient side spreaders constructed and arranged first to spread outwardly over the matrix portions of the upper materials at either side of the toe contiguous with the portions spread by the toe spreaders and thereafter to hold firmly against the matrix, portions of the upper materials in close proximity to the cutting edges of the knives as the knives move toeward in the cutting stroke.

Furthermore, the illustrative machine has a pair of supporting blades associated with the toe wiper which ride upward over the outside of the shoe and enter the fold overlying the bottom of the last at the tip line to support the upper materials forming this fold during the trimming operation.

The illustrative machine also has an interlocking safety mechanism associated with the clamping means whereby the operative trimming elements of the machine can not be started without a shoe in proper working position.

The above and other features of the invention, including novel arrangements, combinations of parts and details of construction, will now be described by reference to the drawings and pointed out in the claims.

In the drawings,

Fig. 2 is a right side elevation of a part of the upper portion of the machine on a scale somewhat larger than that of Fig. 1;

Fig. 2a is a continuation of Fig. 2, showing the remainder of the upper portion of the machine;

Fig. 3 is a side elevation, partly in section, of a portion of the structure of Figs. 2 and 2a, showing driving mechanism for moving the trimming knives and their associated parts;

Fig. 4 is a right side elevation showing elements of the shoe clamping means including the heel abutment and the bottom plate and their associated operating mechanisms;

Fig. 5 is a section along the line V—V of Fig. 4 showing a portion of the adjusting means of the heel abutment;

Fig. 6 is a section along line VI—VI on Fig. 4 showing positioning means for the heel abutment;

Fig. 15 is a section along the line XV—XV of Fig. 13;

Fig. 16 is a front elevation, partly in section, of the mechanism for elevating the trimming knives;

Fig. 17 is a right side elevation of the presser block;

Figs. 17a and 17b are perspective views of the presser block shown in Fig. 17;

Fig. 18 is a right side elevation, partly in section, of the toe gage and other associated structure;

Fig. 20 is a right side elevation of the toe gage and the toe spreaders and their associated operating mechanisms;

Fig. 22 is a plan view of the toe wipers shown in Fig. 20;

Fig. 23 is a section along the line XXIII—XXIII of Fig. 22;

Fig. 25 is a right side elevation of the side spreaders and their operating mechanism;

Fig. 26 is a plan view of the side spreaders shown in Fig. 25;

Fig. 27 is a perspective view of one of the side spreaders shown in Figs. 25 and 26;

Fig. 34 is a left side elevation of a motion transmitting mechanism shown in Fig. 3;

Fig. 35 is a detail plan view, partly in section, of the toe wiper plate and the support blades;

Fig. 36 is a front elevation of the wiper plate and the support blades shown in Fig. 35;

Fig. 37 is a right side elevation of a shoe in position about to be trimmed with parts broken away shown in section.

Figure 1:
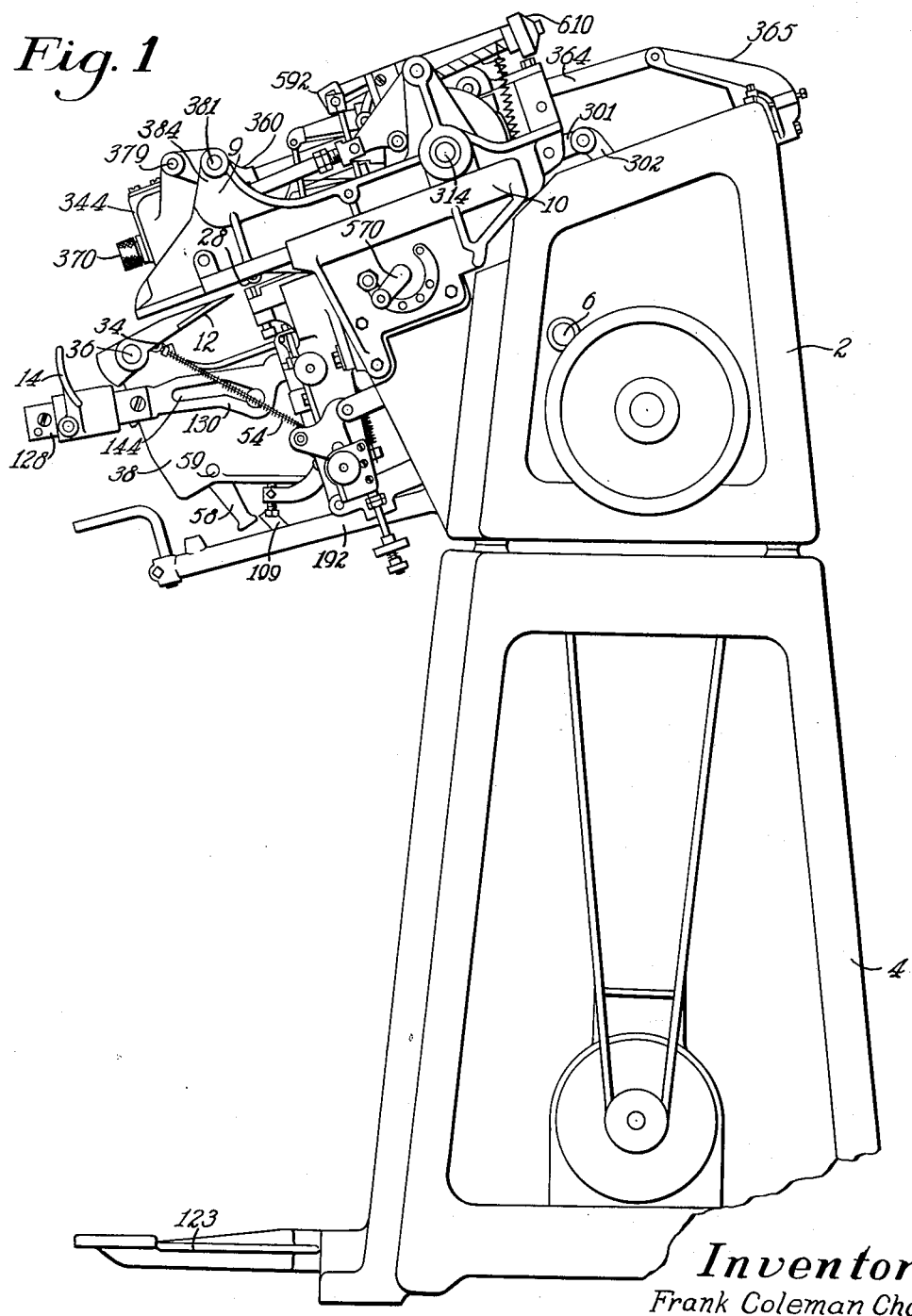
Fig. 1 is a right side elevation of one form of machine in which the invention is embodied.

The illustrative machine has a box-like frame 2 supported on a base 4. A main shaft 6 journaled in bearings formed in the sides of the frame 2 is arranged to make a single revolution when a clutch (not shown in the drawings) is tripped. The mechanism which causes the shaft 6 to make a single revolution when the clutch is tripped is similar to the mechanism disclosed in the specification of United States Letters Patent No. 2,260,483, granted October 28, 1941, on an application of W. T. B. Roberts, and will not be described in detail hereinafter.

A sliding head 9 is mounted on guideways 10 formed in the upper part of the frame 2 for reciprocating movement therein. The guideways 10 extend forwardly and rearwardly and are inclined at an angle of approximately 20° to the horizontal, their rearward ends being the higher.

Figure 10:
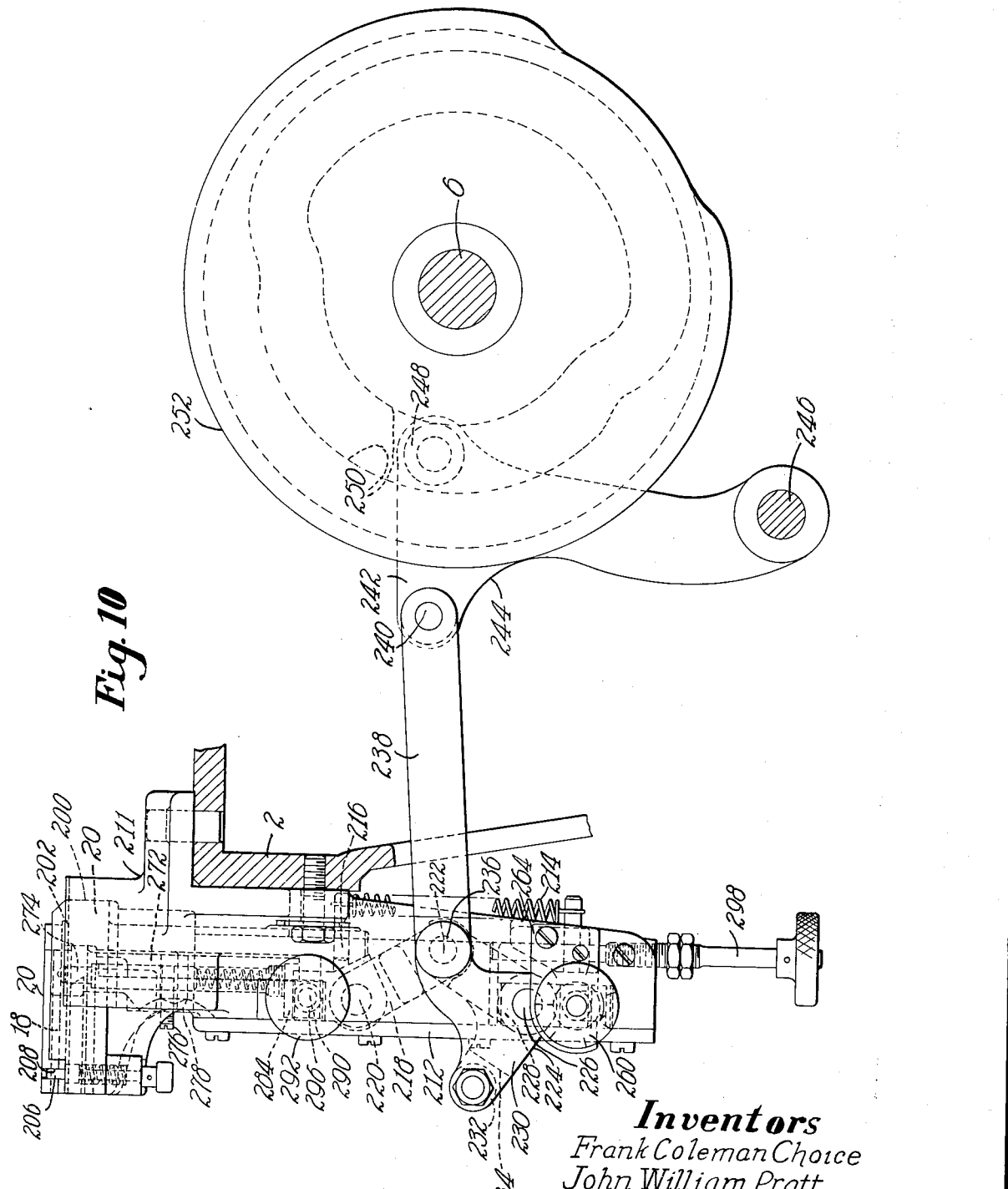
Fig. 10 is a right side elevation, with parts broken away and shown in section, of the toe wiper and its associated structure.
Figure 11:
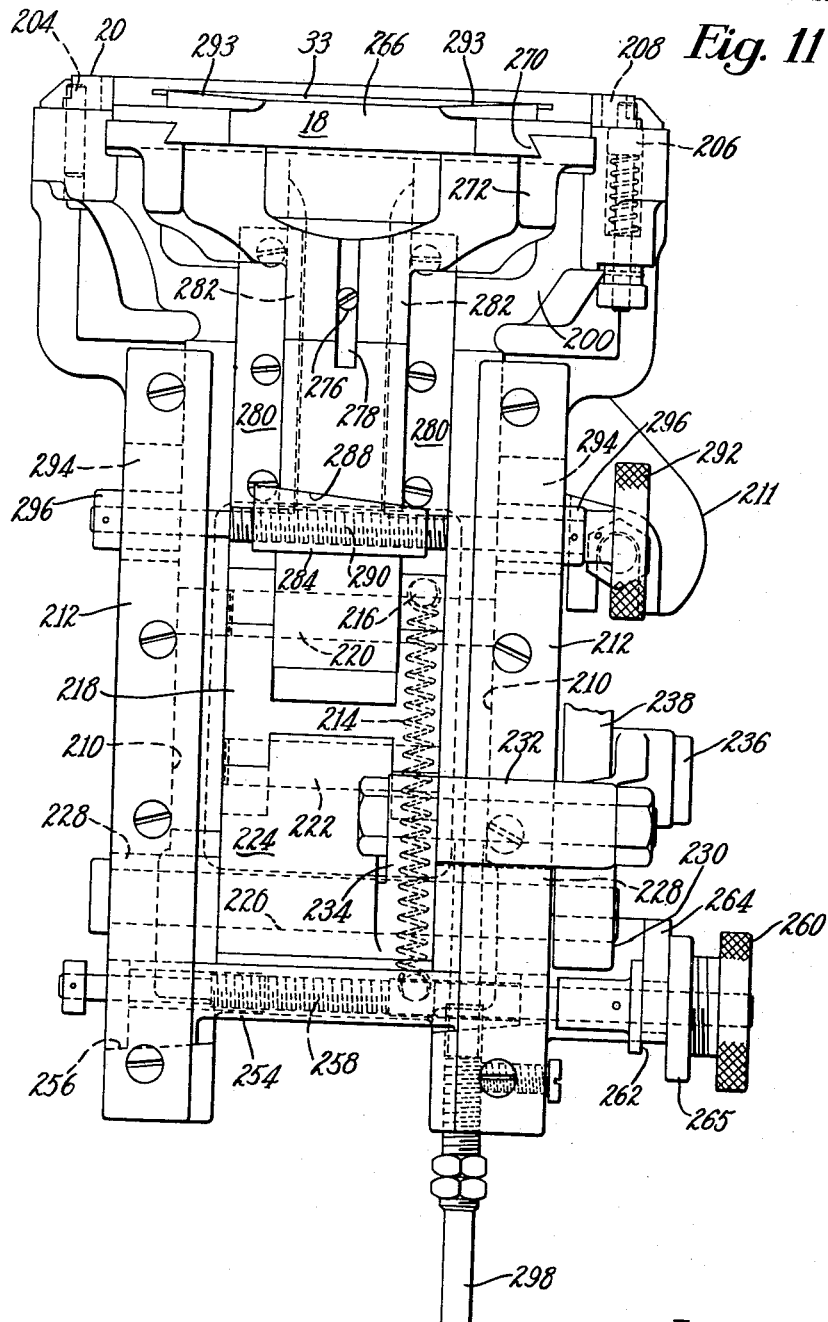
Fig. 11 is a front elevation of the toe wiper mechanism on a scale somewhat larger than in Fig. 10.
Figure 12:
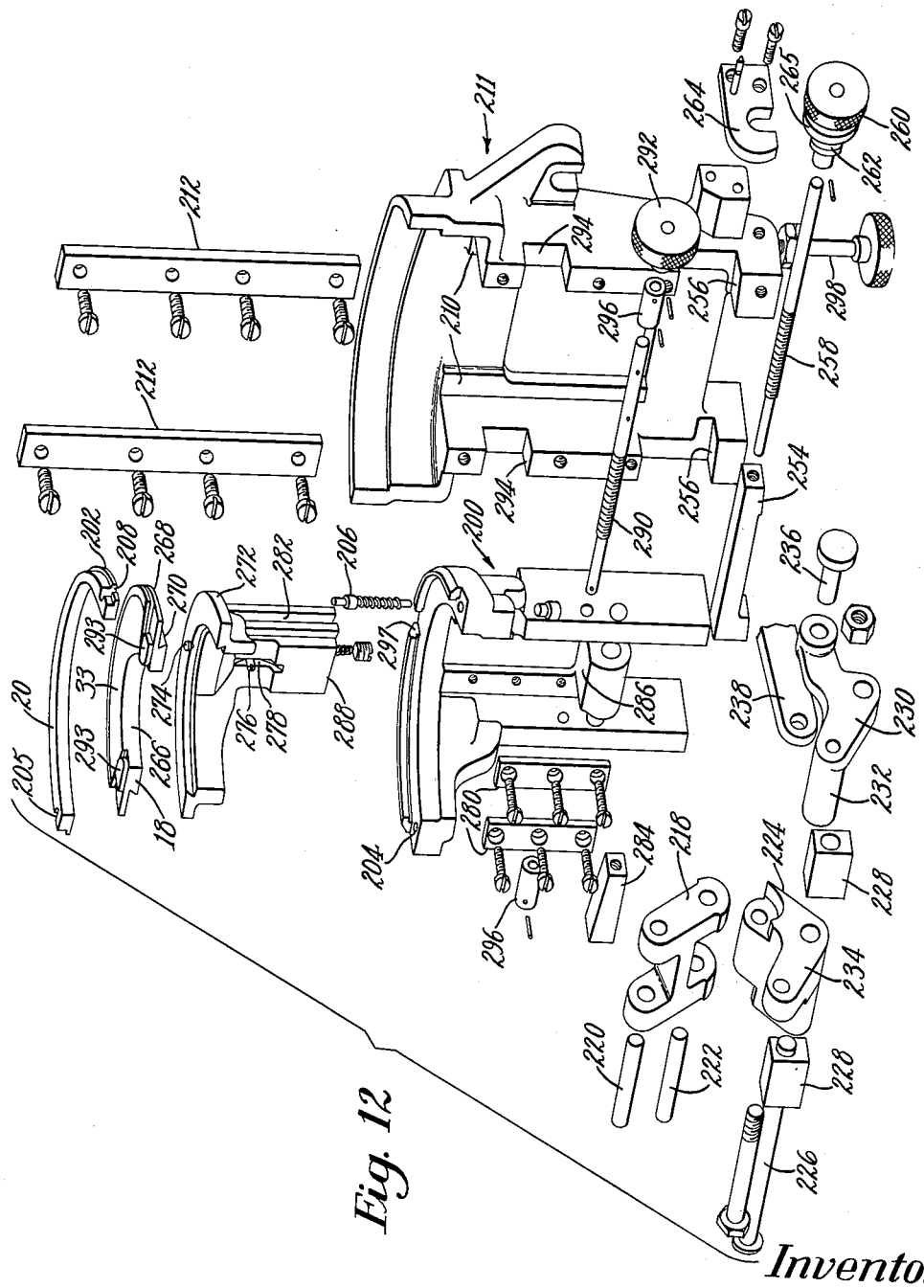
Fig. 12 is an exploded view of the toe wiper shown in Fig. 11.
Figure 14:
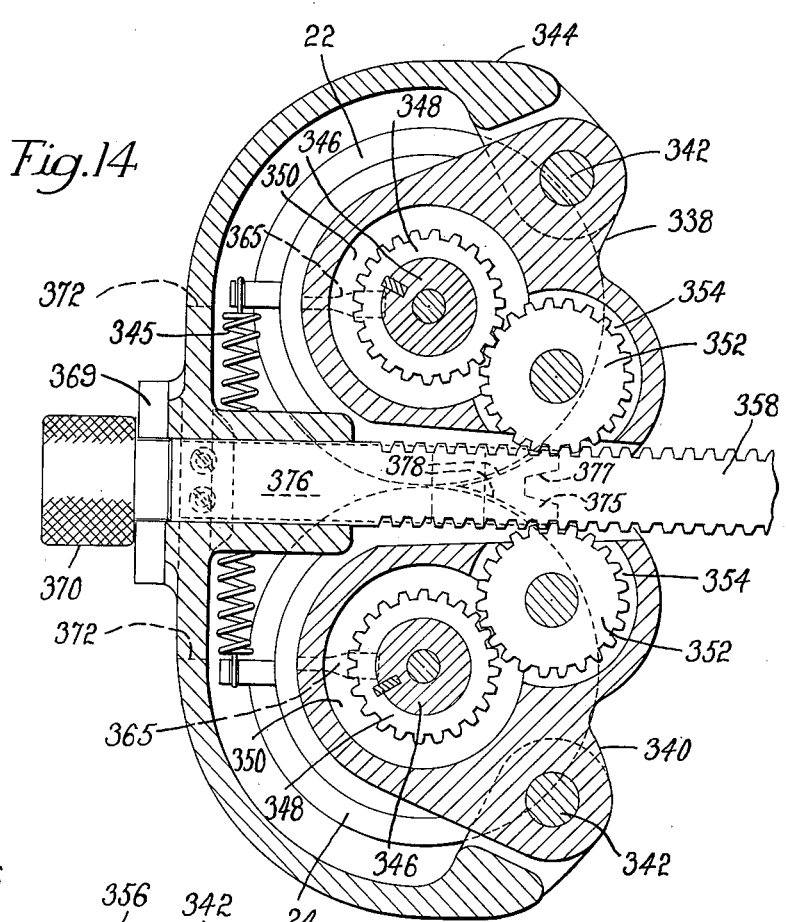
Fig. 14 is a section along the line XIV—XIV of Fig. 13.
Figure 13:
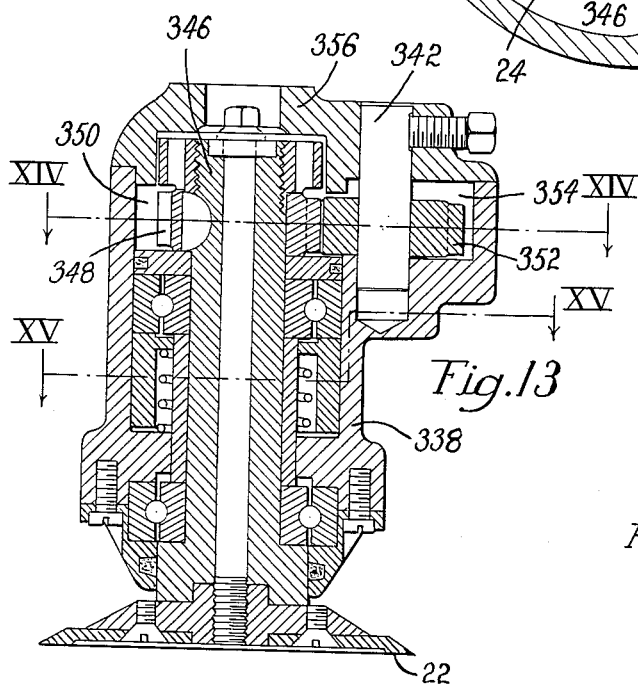
Fig. 13 is a vertical section of one of the trimming knives and its supporting structure.

Mounted on the frame 2, in a manner hereinafter explained, are the principal elements of the machine including: a bottom plate 12, a heel-end abutment 14, a toe rest 16 (Figs. 1 and 2), a wiper plate 18, and a shearing block 20 (Figs. 10–12). A left-hand knife 22 (left, as seen by an operator), a right-hand knife 24 (Figs. 13–16), a pair of toe spreaders 30, a pair of side spreaders 32 (Figs. 2 and 18), a toe gage 26, and an insole roll 28, are carried in the sliding head 9.

A shoe S (Fig. 24) when presented to the machine is on a last F and has marginal portions of its upper materials secured to its insole I at either side of its forepart by pulling-over tacks T. Any pulling-over tack previously driven at the tip of the toe of the shoe is removed by the operator before the shoe is presented to the machine. The toe portions of the upper materials are likely to include at least an outer leather upper U, and an inner lining L, together with a box toe P sandwiched between the lining and the leather upper. The construction of the machine is such that an operator can place the shoe S inverted with its toe against the toe gage 26, and thereafter actuate the toe rest 16 and the heel-end abutment 14 (Figs. 1 and 2) to hold the shoe in a desired position, with its forepart bottom engaging the bottom plate 12 and the insole roll 28.

Figure 29:
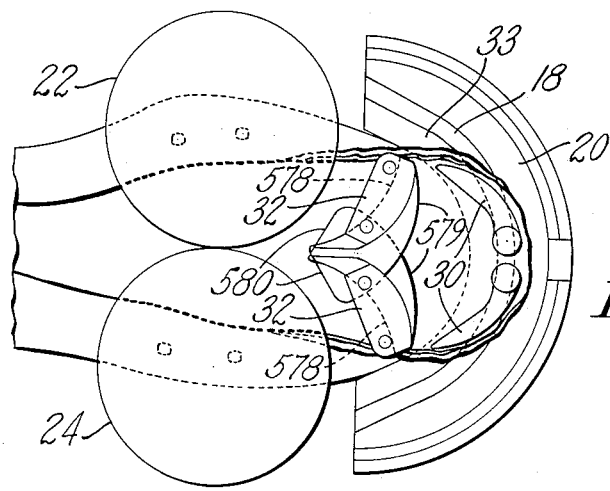
Figure 30:
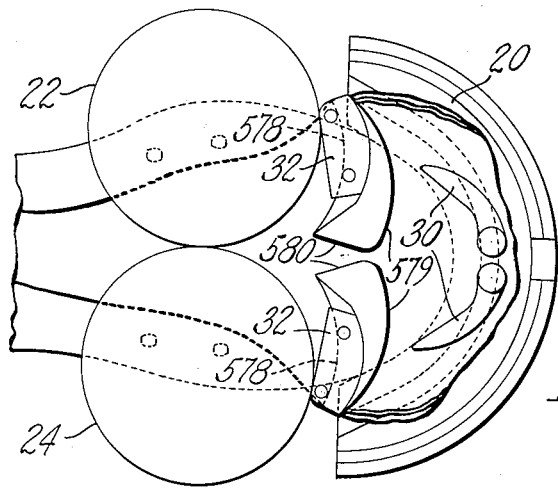
Figure 31:
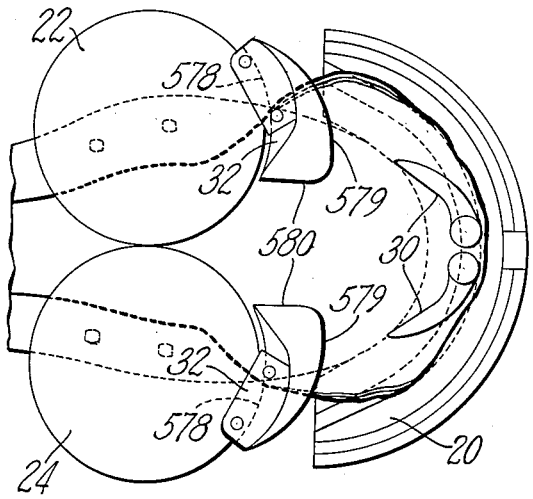

As will be more fully explained hereinafter, while the shoe is so held in the desired position the toe spreaders 30 and the side spreaders 32 (Figs. 28–30) spread margins of the toe portions of the upper materials outwardly away from the insole and last and over a matrix 33 formed in the outwardly flaring upper surface of the wiper plate 18, this matrix being arranged to position and support the upper materials as they are trimmed by the knives 22 and 24. After a preliminary outspreading movement, the toe spreaders 30 press the upper materials against the matrix 33 as the wiper plate 18 rises and thereby assists the wiper plate to apply tension to the upper materials as it makes an upward wiping and lasting movement which wipes the upper materials over the toe portion of the last and draws them snugly to the last. This action of the toe spreader and the wiper plate tends to leave outspread away from the last, and over the matrix, those portions of the upper materials which will, during a subsequent lasting operation, be lasted inwardly over the insole and from which surplus portions of the lining and box toe are to be trimmed away. After the wiper plate 18 has drawn the upper materials snugly around the toe portion of the last, and has raised the matrix 33 into the heightwise position in which it presents the work to the knives 22 and 24, the side spreaders 32 move laterally to spread portions of the upper materials immediately toeward of the pulling-over tacks at the tip line away from the insole and over the matrix. Thereafter, the knives 22 and 24 move toeward to trim the work, the side spreaders 32 moving in advance of the knives pressing down against the matrix in succession those portions of the upper materials next to be trimmed.

As will be more fully explained hereinafter, the knives trim away all material left projecting above the shearing block 20 (see Fig. 37) when the upper materials are pressed down against the matrix 33, the matrix being shaped and positioned to ensure that surplus portions of the lining and box toe project above the shearing block to be trimmed away, leaving below the knife level sufficient of the toe portions of the upper materials to be lasted satisfactorily without undue pleating or excessive bulk. If the lasting margin of the leather upper extends beyond the shearing block 20, the excess will be trimmed away. Also, the matrix can be shaped and adjusted heightwise to ensure that the margin of a thick leather upper is skived as the lining and box toe are trimmed.

The machine embodying the invention has positioning and clamping mechanism which locate a shoe, bottom upward, to be trimmed. However, this mechanism, in addition to serving as the means to secure the shoe in operative position, also serves to actuate a safety device to prevent the spreaders and trimming knives from operating when no shoe is in the machine or when a shoe is incorrectly located so as not to be in position to be operated on by the upper spreading and trimming mechanisms.

The uppermost position of the shoe relative to the trimming knives is determined by the location of the bottom plate 12 and the toe rest 16. The bottom plate (Figs. 2 and 4) is of such a width that it is adapted to extend across a shoe bottom and is shaped so that it may engage the bottom of a shoe heelwardly of the tip line. The bottom plate 12 is mounted on a bracket 34 which pivots on a transverse shaft 36 fixed in a forward extension 38 of the main frame 2. In order to urge the bottom plate upward into position whereby the shoe is presented to the trimming knives, a spring rod 46 (Fig. 2) is pivoted on a pin 48 fixed in the bracket 34 and slides in a sleeve 50 which is pivoted on a pin 52 mounted in a manner described hereinafter. A spring 54 surrounds the rod 46 and is compressed between the end of the sleeve 50 and a collar 56 on the rod 46. The bracket 34 has a downwardly extending lug 40, best seen in Fig. 2, in which is threaded a stop screw 42 secured by a lock screw 44. The head of the stop screw 42 abuts the forward extension 38 and is so adjustable as to prevent the bottom plate reaching the plane in which the knives 22 and 24 move. Thus, the adjustment of stop screw 42 determines the heightwise position of a shoe in the machine. The bottom plate may be rocked downwardly, if desired, about the shaft 36 to provide access to other mechanisms of the machine. Upon rocking the bottom plate downwardly into a position in which the pin 48 lies below the plane through the axes of the pin 52 and the shaft 36, the spring 54 will be effective to hold the plate in a downward position in which the bracket 34 engages a portion of the forward extension 38.

A cylindrical lug 45 extending outwardly from the side of lug 40 engages the sides of a slot 57 formed in the upper end of a safety lever 58 (Fig. 4) which is pivoted between its ends on a pin 59 fixed in the forward extension 38. By rocking the bracket 34 about shaft 36 the safety lever 58 is rocked about the pin 59. This safety lever prevents an operator from starting the machine when the bottom plate 12 is in its inoperative downward position. The manner in which this is accomplished will be explained hereinafter with reference to other mechanism.

Figure 7:
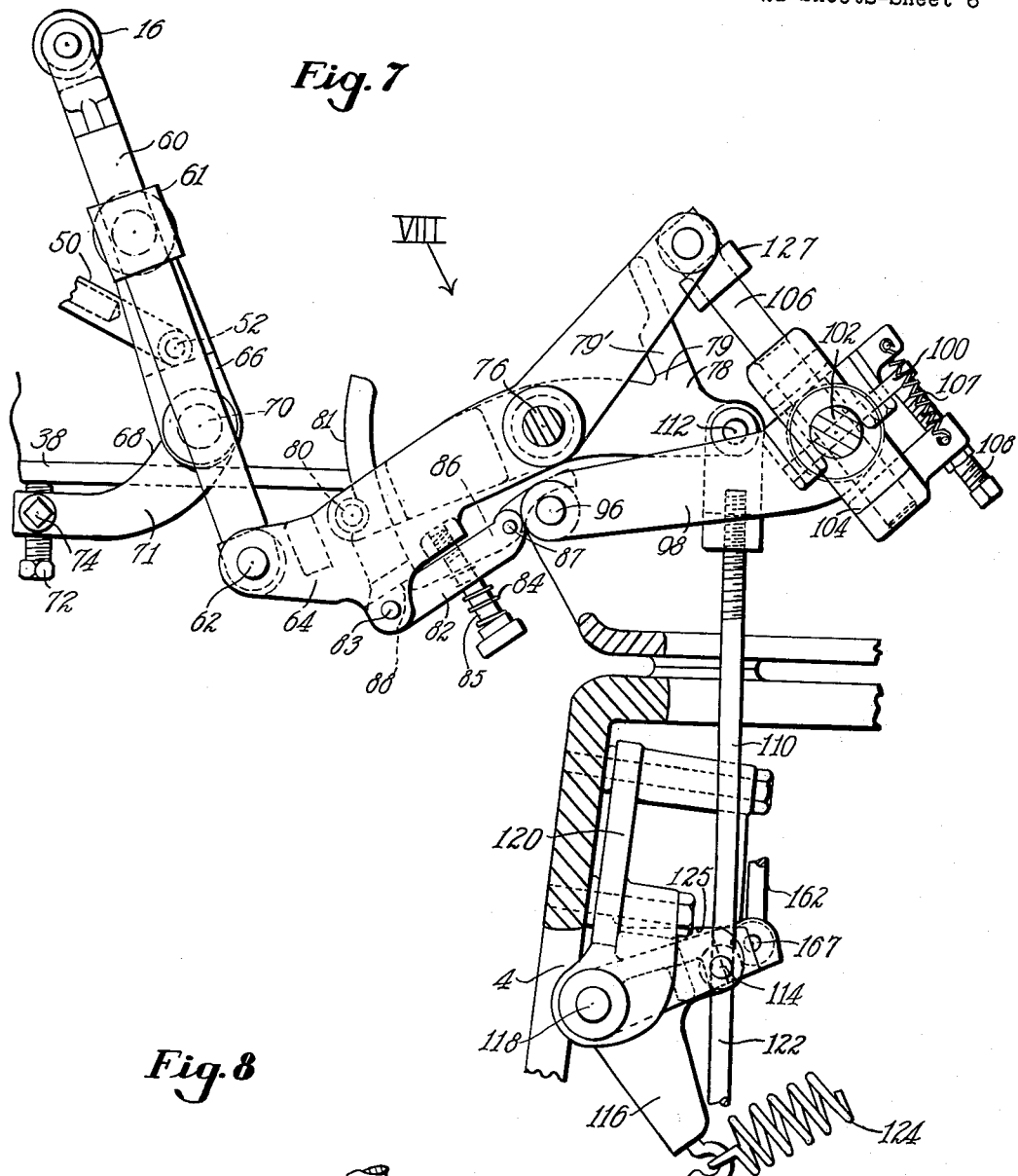
Fig. 7 is a right side elevation showing the toe rest and portions of its operating mechanism.
Figure 9:
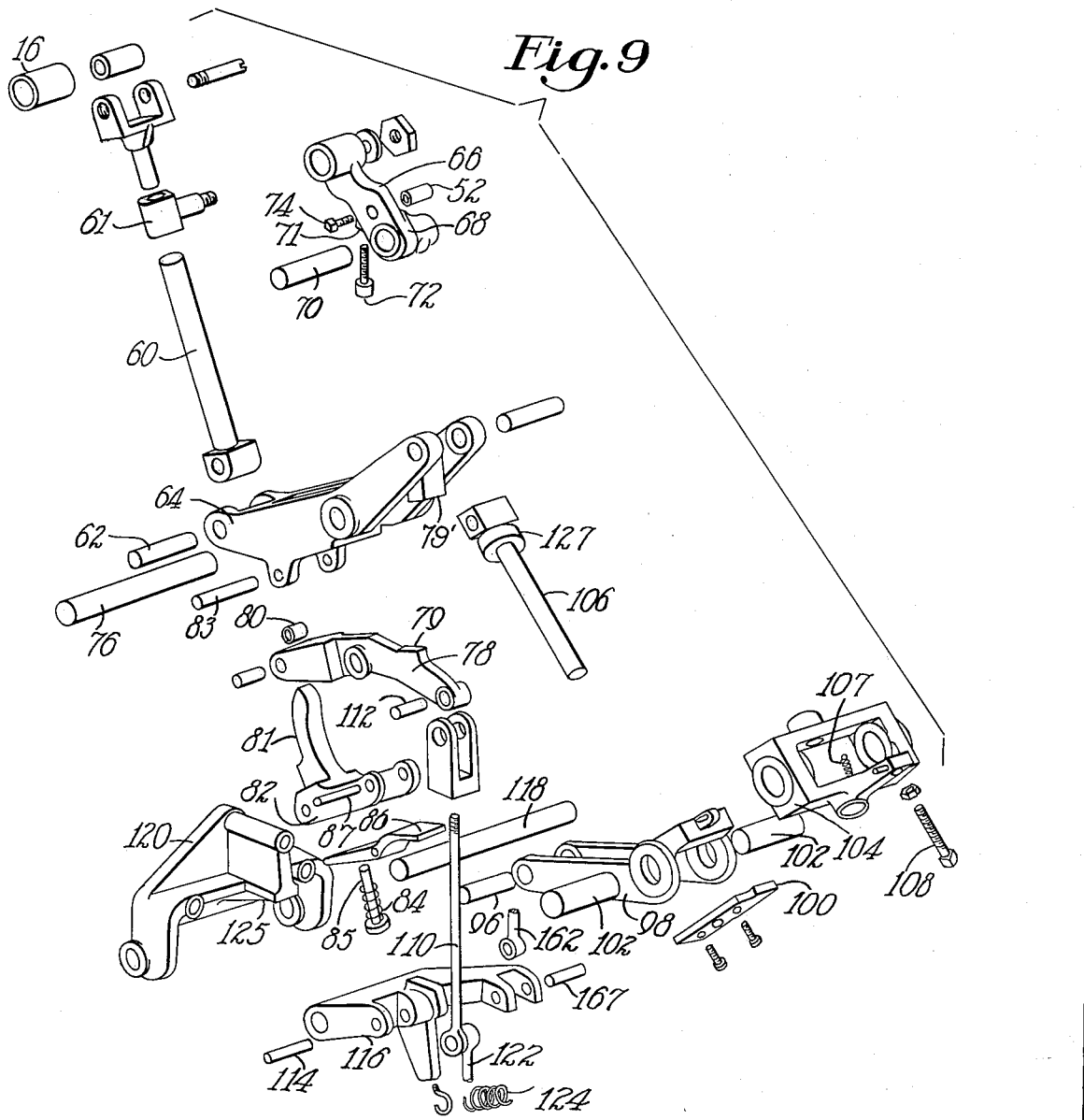
Fig. 9 is an exploded view of the toe rest and its operating mechanism.

Cooperating with the bottom plate to lock the shoe in the proper position for the trimming operation is the toe rest 16 (see Figs. 2, 7 and 9). The toe rest is carried by the upper end of a rod 60 which is slidable in a block 61 and has its lower end pivoted on a pin 62. The pin 62 is mounted in the forked forward end of a force transmitting lever 64. The block 61 is pivoted on the end of an arm 66 of a bell-crank lever 68 which is rotatable on a pin 70 fixed in the forward extension 38. The previously mentioned pin 52 which serves to mount sleeve 50 is fixed in an intermediate portion of the arm 66. The bell-crank lever 68 has a downwardly extending arm 71 which curves below the forward extension 38 and carries a stop screw 72 secured by a set screw 74. When the toe rest is in its operative upward position the stop screw 72 engages the forward extension 38 and the spring 54 holds the bell-crank lever 68 in the position shown in Fig. 7, since the pin 52 is above the plane in which lie pins 48 and 70, as seen in Fig. 2. The operative upward position of the toe rest 16 can be adjusted by means of the stop screw 72.

The toe rest can be swung forward about the pin 62 to provide access to other mechanisms of the machine, as can the bottom plate, the pin 52 then being located below the plane in which lie the pins 48 and 70 so that the spring 54 holds the curved arm 71 in a rearward position with stop screw 72 abutting the forward extension 38.

Figure 8:
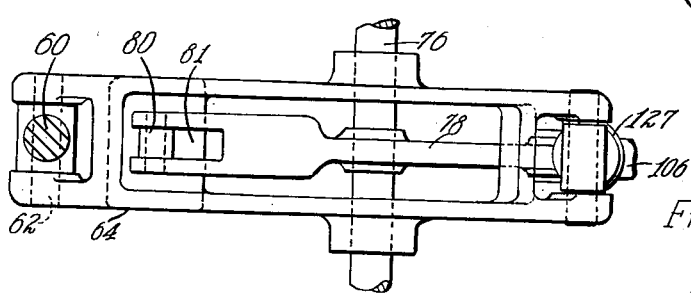
Fig. 8 is a detailed top view taken in the direction of the arrow in Fig. 7 showing a portion of the toe rest force transmitting mechanism.

The toe rest is moved by the lever 64 (Figs. 7, 8 and 9) which has an intermediate portion, divided to form a right and a left hand web, and which is pivoted on a horizontal pin 76 fixed in the frame 2. A lever 78 is pivoted between its ends on the pin 76 and lies between the webs of the lever 64. An upwardly facing abutment 79 formed on the rearward end portion of the lever 78 is arranged to engage a complementary abutment 79′ formed beneath the rearward end of the lever 64 between the webs. A roll 80 rotatably mounted on the forward end of the lever 78 engages a cam face 81 formed on an upwardly extending arm of a bell-crank lever 82 which is pivoted at its elbow on a pin 83 fixed in the webs of the lever 64, the pin 83 being parallel to, forward of, and below the pin 76. The cam face 81 is urged toward the roll 80 by a compression spring 84, and rocking of the lever 78 relative to the lever 64 causes the roll 80 to move with respect to the cam face 81. When the abutment 79 on the lever 78 engages the complementary abutment 79′ on the lever 64, the roll 80 engages a depression in the cam face 81.

The construction and arrangement is such that rocking movement imparted to the lever 78 in a clockwise direction, in a manner hereinafter described, causes the lever 64 to rock and press the toe rest 16 against a shoe by reason of the engagement of the roll 80 in the depression of the cam face 81. The pressure which the lever 78 causes the toe rest to apply to the shoe is limited by the spring 84 which yields and allows the roll 80 to leave the depression in the cam face 81, thereby permitting relative movement of the lever 78 and the lever 64.

The toe rest is locked in its operative position by means now to be described. The spring 84 is mounted on a bolt 85 fixed in the lever 64, the lower end of the spring engaging the head of the bolt and the upper end engaging an intermediate portion of a forwardly extending arm of a latch 86. The latch 86 lies between the branches of a fork formed in a rearwardly extending arm of the bell-crank lever 82 and is pivoted between its ends on a pin 87 fixed in these branches. The end portion of the forwardly extending arm of the latch 86 is arranged to engage an abutment 88 formed in the bell-crank lever 82. A rearwardly extending arm of the latch 86 lies above and engages a pin 96 fixed in a fork formed in the forward end of a locking lever 98, on which is fixed a locking plate 100. The rearward end of the locking lever 98 pivots on coaxial pins 102 fixed in the frame 2 and lies within a trunnion piece 104 which also pivots on the coaxial pins 102. A locking rod 106 slides in bores formed in the trunnion piece 104, passing through a bore in the locking plate 100 (and between the coaxial pins 102), and has its upper end pivotally connected to the rearward end of the lever 64. A tension spring 107, anchored to the trunnion piece 104 and to the locking lever 98, acts to urge the locking plate 100 against a stop screw 108 threaded in the trunnion piece 104. When the locking plate 100 engages the stop screw 108 the bores in the trunnion piece are alined with the bore in the locking plate, the locking rod 106 being then free to slide through these bores.

When the spring 84 yields, under the pressure of the toe rest against the shoe, the bell-crank lever 82 and latch 86 pivot together about the pin 83. The forward end of the latch 86 remains in contact with the abutment 88 and the rearward end of the latch moves downwardly around the pin 96 fixed in the locking lever 98, causing the locking lever 98 to rock, against the resistance of the spring 107, until the locking plate 100 binds on the locking rod 106, and so locks the lever 64 and the toe rest 16 to resist a downward thrust applied to the toe rest by a work piece. Thereafter, as the lever 78 continues to rock, the latch 86 rocks relative to the bell-crank lever 82, its forward end moving away from the abutment 88. It will be understood that rocking of the lever 64 involves slight rocking of the locking rod 106 and hence slight movement of the locking lever 98 and pin 96. The underside of the rearward arm of the latch 86 is suitably shaped to ensure that the pin 96 remains adjacent to it during initial rocking of the lever 64 in unison with the lever 78.

To cause the movement of lever 78 and its associated mechanism, there is provided an upper treadle link 110 having its upper end pivoted on a pin 112 fixed in the rearward end of the lever 78 and its lower end pivoted on a pin 114 fixed in a treadle lever 116. The treadle lever 116 pivots about a pin 118 fixed in a bracket 120 secured to the base 4. Also pivoted on the pin 114 is the upper end of a lower treadle link 122 pivotally connected to a treadle 123 (Fig. 1). The treadle lever 116 is urged upward by a tension spring 124 stretched between the treadle lever and the base 4, upward movement of the treadle lever being limited by an abutment 125 formed on the bracket 120.

When an inverted shoe is correctly positioned in the illustrative machine, depression of the treadle 123 will cause the toe rest 16 to press the forepart of the shoe upward against the bottom plate 12 and insole roll 28. As further pressure is applied to the treadle the rising of the toe rest and the movement of the lever 64 are arrested, so that the spring 84 yields and the lever 78 rocks relatively to the lever 64. Further downward movement of the treadle acts through the latch 86 and locking lever 98 to lock the toe rest in a shoe supporting position.

When no shoe is in position in the machine or when a shoe is incorrectly positioned, for instance, when it is placed to the left of bottom plate 12, as viewed in Figs. 2 and 4, upward movement of the toe rest is limited by a collar 127 fixed to the locking rod 106 engaging an upward face formed on the trunnion piece 104.

When the treadle 123 is released, the spring 124 acts through the treadle lever 116, the upper treadle link 110, and the lever 78 first to cause the abutment 79 to engage abutment 79¹ on the lever 64 (the lever 64 remaining locked in position until the roll 80 enters the depression in the cam face 81), and thereafter to cause the toe rest 16 to descend into its inoperative position. Thus, the abutment 125, which limits upward movement of the treadle, determines the inoperative position of the toe rest.

The shoe is clamped lengthwise in trimming position by means of the heel abutment 14 (Figs. 1 and 4) which is slidable forwardly and rearwardly in a slideway 128 formed in the forward end of an abutment bar 130. The heel abutment 14 carries a spring plunger 132 (see Figs. 4 and 6) arranged to engage any one of a plurality of holes 134 formed in the abutment bar 130, making the heel abutment 14 adjustable on the abutment bar 130 to the size of a particular shoe. The rearward end of the abutment bar 130 is pivoted on a pin 136 fixed in the end of an upwardly extending arm 138 which is in turn pivoted on a shaft 140 fixed in the frame 2. The intermediate portion of the abutment bar 130 is supported by an eccentric 142 which engages a cam slot 144 formed in the bar 130 (see Fig. 5). Rocking of the arm 138, in a manner hereinafter explained, causes the heel abutment 14 to move forwardly or rearwardly as the abutment bar 130 slides on the eccentric 142. The shape of the cam slot 144 is such that the heel abutment, when in its forward inoperative position, is raised upward to lie close to the bracket 34, so that an operator may conveniently pass a shoe beneath the heel abutment in order to position it in the machine.

The eccentric 142 (see Fig. 5) is formed on the right-hand end of a pin 146 journaled in the forward extension 38. An arm 148 fixed to the left-hand end of the pin 146 carries a spring plunger 150 arranged to engage any one of a plurality of holes 152 formed in the forward extension 38. Thus, the plunger 150 serves to secure the eccentric 142 in a desired position such that the heel abutment is correctly positioned heightwise as it engages a particular shoe.

The arm 138 is actuated by a bell-crank lever 154 rockable on the shaft 140 and having an upward arm 156 on which there is an abutment 158 arranged to engage a complementary abutment 159 formed on the arm 138. A pair of tension springs 160 anchored to the arm 138 and to the arm 156 urge the abutment 158 into contact with its complementary abutment 159.

A link 162 connects, by means of a pin 164, the end of a rearward arm 166 of the bell-crank lever 154 to a pin 167 (Fig. 7) fixed in the treadle lever 116. When the treadle 123 is depressed the bell-crank lever 154 and the arm 138 rock together about the shaft 140 until the heel abutment 14 meets the shoe and presses it against the toe gage 26. Thereafter, the springs 160 yield and allow the abutment 158 to move away from the abutment 159.

To prevent the machine being operated without a shoe in the working position, interlocking means, now to be described, prevent the clutch being tripped until the springs 160 have yielded. For this purpose the rearward end of a safety lever 168 having a notch 170 is pivoted on a pin 172 fixed in the end of the arm 156 and a latch 174 is pivoted between its ends on a pin 176 fixed in the arm 138. When the heel abutment is in its forward, inoperative position, the latch 174 is held, with its lower end portion engaging an abutment 178 formed in the arm 138, by a tension spring 180 anchored to the arm 138 and to the upper end of the latch. At this time the forward end of the safety lever 168 rests on a boss 182 formed in the forward extension 38 of the frame 2, the notch 170 being a little above and a little forward of a notch-engaging face of the latch 174. A clutch link 184 has its rearward end pivoted on a lever which operates the clutch (lever and clutch are not shown in the drawings but are similar to those shown in United States Letters Patent No. 2,260,483, granted Oct. 28, 1941, on an application of W. T. B. Roberts) and its forward forked end pivoted on a pin 186 fixed in the lower end of a link 188, the upper end of which is pivoted on a pin 190 fixed in an intermediate portion of the safety lever 168. The link 188 is shaped to clear the shaft 140. The forked rearward end of a trip handle 192 is pivoted on the shaft 140. The forked forward end of the clutch link 184 lies between the arms of the fork in the trip handle. The trip handle tends to fall, due to its weight, this downward movement being limited by an abutment 194 on the handle engaging a stop pin 195 fixed in the frame 2.

With the heel abutment 14 in its forward position, and the trip handle in its downward position, the clutch link rests with a notch 196 formed in its forward end lying forward of and above a catch plate 198 secured to the trip handle. When the treadle 123 is depressed and the arm 138 and bell-crank lever 154 rock together about the shaft 140, the safety lever 168 leaves the boss 182 and rests on the upper end of the latch 174, the notch 196 remaining above the catch plate 198. When, however, the heel abutment 14 presses the shoe against the toe gage and the springs 160 yield, the notch 170 is drawn past the latch 174 and the safety lever 168 drops sufficiently to allow the notch 196 to engage the catch plate 198. Thus, as soon as the heel abutment 14 is clamped firmly against the work, the trip handle 192 may be lifted to trip the clutch. Should the operator, however, attempt to trip the clutch before the springs 160 have yielded, the trip handle rises idly, its catch plate 198 passing freely underneath the notch 196.

When the treadle is released the springs 160 move the abutment 158 into engagement with the abutment 159, the notch 170 rotating the latch 174 about its pin 176 against the resistance of the spring 180. Thereafter, as the arm 138 and bell-crank lever 154 continue to rock together, the safety lever 168 is lifted by the boss 182, the notch 170 releasing the latch 174 which engages the abutment 178 under the action of the spring 180.

A lug 199 formed on the trip handle 192 lies immediately beneath the lower end of the safety lever 58 when the bottom plate 12 is in its lowered inoperative position and hence prevents an operator raising the trip handle to start the machine while the bottom plate is lowered.

Portions of the toe forming mechanism will now be described with particular reference to Figs. 10–12. The wiper plate 18, shearing block 20, and matrix 33 cooperate with the toe and side spreaders to stretch the upper materials over the last to present to the trimming knives those portions of the materials that are to be trimmed. The shape of the upper surface of the shearing block 20, which is a plate of generally semicircular configuration, determines the maximum width of the lasting margin of the upper leather. Surplus upper leather overlying this block is trimmed away, when the knives move past the block (Fig. 37).

The shearing block 20 lies to the rear of the toe rest, i. e., to the right as the machine is viewed in Fig. 1, and is mounted on the upper portion of a slide 200. The block is locked to the slide by means of the following structure. An arcuate tongue 202 formed on the shearing block engages a complementary groove formed in the slide. A vertical dowel 204 fixed in the left-hand upper portion of the slide (Fig. 11) engages a dowel slot 205 in the shearing block and a vertical spring plunger 206 mounted in the right-hand upper portion of the slide engages a slot 208 in the shearing block so that an operator may take a shearing block of a desired shape to conform with the particular shoe to be trimmed, engage its dowel slot 205 with the dowel 204, and swing the shearing block rearward about the dowel until the arcuate tongue 202 engages the groove. He then locks the shearing block in position by means of the spring plunger 206.

The slide 200 with the shearing block 20 mounted on it is movable vertically in slideways 210 formed by a bracket 211 fixed to the frame 2 and by plates 212 bolted to the bracket. A spring 214 anchored to the bracket 211 and to a pin 216 carried by the slide 200 urges the slide downward. The slide 200 is moved upward against the action of the spring means of an H-shaped toggle link 218 which has its upper end portions pivoted on a pin 220 fixed in the lower portion of the slide. The lower end portions of the toggle link 218 are pivoted on a pin 222 which is fixed in the upper end of a second toggle link 224. The lower portion of link 224 is pivoted on a pin 226 which is carried in blocks 228. The blocks 228 are slidable vertically in the slideways 210.

To make and break the toggle 218, 224 which raises and lowers the slide, a bell-crank lever 230 is mounted on the right-hand end of the pin 226. A forwardly extending arm of this bell-crank lever has a lateral extension 232 bolted to a forwardly extending lug 234 formed on the lower toggle lever 224, so that the bell-crank lever 230 and the lower toggle link 224 pivot together about the pin 226. An upwardly extending arm of the bell-crank lever 230 carries a pin 236 coaxial with the pin 222, on which is pivoted the forward end of a cam link 238 (Fig. 10). The rearward end of the cam link 238 is pivoted on a pin 240 fixed in a lug 242 projecting forward from the upper end of a cam lever 244 which is pivoted on a pin 246 fixed in the frame 2. A cam roll 248 rotatably mounted on the upper end of the cam lever 224 engages a cam track 250 formed in the left side of a cam 252 mounted on an intermediate portion of the main shaft 6. The shape of the cam track 250 is such that the cam lever 244 rocks once forwardly and once rearwardly during a single revolution of the main shaft 6.

The arrangement is such that when the clutch is tripped and the main shaft makes a single revolution, the pin 222 first moves forwardly to straighten the toggle and raise the slide 200 with the shearing block 20, and then moves rearwardly to break the toggle and lower the slide and shearing block.

As stated above, in its uppermost surface the shearing block 20 cooperates with the knives 22 and 24 which move past it to trim the surplus material. The means by which this uppermost position is accurately adjusted will now be described. The upper surface of a wedge 254 engages the under surface of the blocks 228 and the lower surface of wedge 254 engages inclined faces 256 formed on the bracket 211. A screw 258 threaded in the wedge 254 has a knurled head 260 in which is formed a groove 262. A tongue 264 fixed to the bracket 211 prevents the screw 258 moving axially so that rotation of the knurled head 260 causes the wedge to traverse beneath the blocks 228 and so enables an operator to adjust precisely the uppermost position of the slide 200 and of the shearing block 20. A block nut 265 threaded on the knurled head 260 serves to clamp the knurled head to the tongue 264, and thus serves to retain the wedge 254 in a desired position.

The wiper plate 18 cooperates with the shearing block 20 to determine the amount of upper materials to be trimmed as well as to tension the upper materials over the toe of the last (Fig. 37). The upper face of the wiper plate 18 has the matrix 33 formed in it (see particularly Fig. 12) and has a concave wiping edge 266 adapted to engage the toe of a shoe, and a convex outer edge portion 268 which engages a complementary portion of the shearing block 20. The matrix 33 constitutes a beveled surface of about 5° over a substantial portion of the wiper plate and in operative position is always below the upper face of the shearing block 20 (Fig. 37). The shape and position of the matrix 33 determine the amount of the upper materials to be accommodated below the upper face of the shearing block, and hence the amount of surplus upper material to be trimmed, as shown in Fig. 37. The method by which the heightwise position of the wiper plate and thus the matrix 33 is adjusted will be explained hereinafter. The matrix 33 can be shaped and the heightwise position of the matrix and shearing block so located relative to the knife as to enable an operator to skive the margin of a leather upper in addition to trimming the lining and box toe should he so desire.

The size of the wiper plate and the shape of most upper materials are such that portions of the upper materials, particularly the upper leather, at the extreme tip of the toe of a shoe overlie the shearing block 20 when the upper materials are spread out over the matrix 33. Thus the shearing block 20 insures that material is cleanly severed to a predetermined length when the two knives 22 and 24 meet the block.

The wiper plate 18 has an arcuate dovetail 270 which engages a complementary dovetail formed in the upper end portion of a carrier 272. A spring plunger 274 housed in the carrier 272 engages a hole in the wiper plate and retains the wiper plate in position. A pin 276 fixed to the plunger 274 protrudes forward through a slot 278 in the carrier 272 and enables an operator to depress the spring plunger 274 to release the wiper plate when it is desired to change to a wiper plate of a different size or shape.

The carrier 272 is guided for vertical movement by a pair of plates 280 which are fixed to the slide 200 and engage grooves 282 formed in the carrier. The carrier 272 is supported on a wedge 284 which rests on an upward face 286 formed in the lower portion of the slide 200, the upper face of the wedge engaging an inclined face 288 formed at the bottom of the carrier 272. A screw 290 rotatable in holes in the slide 200 and having a knurled head 292 passes through clearance slots 294 formed in the bracket 211 and is threaded in the wedge 284. Collars 296 fixed to the screw 290 engage side faces of the slide 200 and prevent axial movement of the screw 290. Rotation of the knurled head 292 by an operator will raise or lower the carrier 272 and with it the wiper plate 18 relatively to the shearing block 20, to determine the extent to which the lining, box toe and upper will protrude above the shearing block and hence to determine the amount of material to be trimmed away.

Upward movement of the wiper plate 18 and the shearing block 20 carries them into a position previously occupied by the toe gage 26 (Figs 2 and 18), the toe gage being withdrawn in a manner hereinafter described. The toe gage 26 is not fully withdrawn rearward of the slide 200 and accordingly a clearance slot 297 (Fig. 12) is provided in the slide 200 to accommodate the toe gage 26. Upward movement of the wiper plate 18 is limited by engagement of the upper end of the carrier 272 with the under side of the shearing block 20.

The amount of wiping movement imparted by the wiper plate 18 may be varied by limiting its downward movement. For this purpose the upper end of a screw 298 threaded in the bracket 211 and having a knurled head is arranged to engage an under surface of the slide 200. The cam track 250 (Fig. 10) is provided with clearance to allow this limiting of the downward movement of the wiper plate 18.

To enable the machine to trim material immediately toeward of the pulling-over tacks contiguous with the previously side lasted portions of the upper at the tip line, a pair of supporting blades or lugs 293 are carried in the wiper plate 18. These are best seen in Figs. 35 and 36. The blades are pivoted on pins 295 fixed in the wiper plate and their operative forward end portions are urged inwardly toward each other by spring biased plungers 299 housed in the wiper plate adjacent the rearward ends of the blades. These blades ride on the sides of the shoe as the wiper plate wipes in an upward direction and move inwardly over the bottom of the last into the folds previously formed in the upper materials in the area immediately toeward of the pulling-over tacks at the tip line under the action of the plungers 299 when the wiper plate reaches its uppermost position. In this way the upper materials forming the fold are supported to insure their being trimmed. Were these supporting blades not used, there would be no support for the folded or pleated material since it lies over the bottom of the last and the wiper plate 18 surrounds the last on the outside only.

As stated previously, some of the elements of the trimming mechanism, to wit, the knives 22 and 24, the toe gage 26, the insole roll 28, the toe spreaders 30 and the side spreader 32, are carried in a sliding head 9 which reciprocates in the upper portion of the machine frame 2. This sliding head is inclined at an angle of about 20° to the horizontal and reciprocates forwardly and rearwardly in the guideways 10.

The trimming knives are arranged to move with the head to make a cutting movement in a plane parallel to the guideways 10. The knives are also arranged to make a preparatory movement downwardly within the head from an inoperative position into the plane in which they make their cutting movement. This movement is imparted to the knives by means of a pair of rotating cams 400 mounted in the head (only one cam being seen in Figs. 2a and 3) and which derive their motion from the main drive shaft by means hereinafter described.

The means by which the sliding head 9 is moved in its guideways 10 will now be described (see Figs. 3 and 34). A link 301 pivotally connects the slide to a lever 302, the lower end of which is pivoted on a pin 303 fixed in a rearward portion of the frame 2. Rocking of the lever 302 about the pin 303 will move the sliding head 9 forwardly or rearwardly in the guideways. Rocking motion is transmitted to lever 302 by the following mechanism. An intermediate portion of the lever 302 is pivotally connected to the rearward end of the cam link 304, the forked forward end of which embraces a block 306 rotatably mounted on an intermediate portion of the main shaft 6. A cam roll 308, journaled on an intermediate portion of the cam link 304, engages a cam track 310 formed in the right side of a cam 312 fixed to the main shaft. The forked end of the cam link 304 slides freely on the block 306 between the right face of the cam 312 and the left face of a second cam (not shown in the drawings) which forms part of the clutch mechanism which is not described in detail herein.

The shape of the cam track 310 is such that when the clutch is tripped the sliding head remains at rest until the main shaft 6 has made just over one third of a revolution. The sliding head then moves first rearwardly and then forwardly under the action of the cam track 310, regaining its forward position just before the main shaft 6 comes to rest, the machine having completed the trimming of a shoe. The timing of the movements of the sliding head 9 will be more fully explained hereinafter.

The cams 400 which impart downward movement to the knives are mounted on a cam shaft 314 which is journaled in the sliding head 9. This cam shaft lies transversely in the sliding head 9 and is driven by a chain 318 (Fig. 34) which connects a sprocket wheel 320 fixed to the cam shaft 314 near its left end to a sprocket wheel 322 fixed to the left end of the main shaft 6. The chain 318 also passes around two idler sprockets 324 and 326, mounted in a manner now to be described, and arranged to maintain an even tension in the chain 318 as the sliding head moves.

Referring to Fig. 34, it will be seen that the idler sprocket 324 is rotatably mounted on an intermediate portion of a chain arm 328 the lower end of which is pivoted on a pin 330. This pin 330 is coaxial with the main shaft 6 and is fixed to the left-hand side of the frame 2. The idler sprocket 326 is rotatably mounted on the right end of a pin 334, the left end of which is fixed in the upper end of the chain arm 328. A turnbuckle link 336 has its forward end pivoted on the left end of the cam shaft 314 and its rearward end pivoted on the intermediate portion of the pin 334. The construction and arrangement are such that the length of the turnbuckle link 336 may be adjusted to obtain a desired tension in the chain 318, but such adjustment of the turnbuckle link 336 will not cause the chain 318 to be appreciably tightened or loosened as the sliding head 9 moves in the guideways 10.

Referring to Figs. 3, 13, 14, 15 and 16, the left- and right-hand knives 22 and 24 are rotary knives with circular cutting edges, each cutting edge being formed by the intersection of a lower plane face of the knife and an upper conical face of the knife. The knives 22 and 24 are detachably mounted, in a manner now to be described, in left- and right-hand knife brackets 338 and 340 (Fig. 15), each of which is pivoted on one of two pins 342 fixed in a knife frame 344 carried in the sliding head 9. A tension spring 345 having one end anchored to each of the knife brackets urges the brackets toward each other about their pivot pins 342. Movement of the knife brackets under the action of the spring 345 is limited in a manner hereinafter described.

Each knife 22 and 24 is fixed to a knife shaft 346 journaled in the knife brackets 338 and 340 and has a pinion 348 fixed to its upper end. The knife shafts 346 and pins 342 are parallel and remain substantially perpendicular to the plane of the guideways 10 whatever may be the positions of the knife brackets 338 and 340 and the knife frame 344.

The cutting edges of the knives are in a common plane and axial movement of the shafts 346 is prevented by faces on the pinions 348 and the knives engaging complementary faces on the knife brackets. Each pinion 348 is housed in a recess 350 formed in its knife bracket and engages an idler pinion 352 rotatably mounted in a recess 354 formed in the knife bracket. Each knife bracket has a knife bracket cap 356 which encloses the pinions 348 and 352 in their recesses except for a portion of the periphery of each pinion 352 which protrudes from its recess 354 and engages teeth formed in the adjacent side of a double rack 358.

The double rack 358 lies between the knife brackets, its forward end being slidably mounted in the knife frame 344 and an intermediate portion being slidably mounted in a lug 360 (Fig. 3) extending downwardly from the rearward end of a rack bracket 362 secured to the knife frame, this lug 360 being rearward of the idler pinions 352.

The rearward end of the double rack 358 is pivotally connected to the forward end of a rack link 364 (Fig. 2a), the rearward end of which is pivotally connected to a bracket 365 (Fig. 1) on the frame 2.

The arrangement is such that movement of the sliding head 9 in its guideways 10 causes the knife frame 344 with the knife brackets 338 and 340 to move lengthwise of the double rack 358 and hence causes the double rack 358 to rotate the knives 22 and 24 by means of the pinions 352 and 348. The rack link 364 allows the double rack to rise or fall when the knife frame 344 is moved relatively to the sliding head 9 in a manner hereinafter explained. The action of each knife is such that it tends to spread the lining and upper outwardly away from the shoe and over the matrix 33 as it cuts.

To prevent the scrap trimmed from the work becoming wedged above the knives, a paddle 365 (Figs. 14 and 16) is fixed to each knife shaft 346 immediately above the knife. These paddles are so located on the shafts 346 that they point rearwardly and swing away from each other as the most toeward portion of a lining is trimmed by the knives. A substantially rectangular portion 372 of the knife frame 344 is cut away adjacent the knives to provide an opening for chip clearance.

The knives 22 and 24 must be close together since any gap between the knives would result in a portion of a work piece passing untrimmed between the knives. Since each time the knives are sharpened they decrease in diameter, it is necessary to swing the knife brackets 338 and 340 toward each other about their pins 342 to compensate for this decrease. To effect this adjustment each knife bracket has fixed in it a downwardly extending pin 366 (Fig. 15) which engages one of two slots 367 formed in the head of an adjusting bolt 368 the shank of which extends forward through a clearance hole in the knife frame. This adjusting bolt lies beneath the double rack 358 and parallel to it. A tongue piece 369 fixed to the knife frame engages a groove formed in a grooved nut 370 threaded on the adjusting bolt 368. Rotation of the grooved nut 370 causes the adjusting bolt 368 to move forwardly or rearwardly and hence moves the knives 22 and 24 together or apart. The spring 345 takes up any backlash in this adjusting mechanism.

When a new pair of knives is adjusted correctly, the axes of the idler pinions 352 lie a little way forward of the plane of the pins 342, and as the knives decrease in size with repeated sharpening the axes of the idler pinions are adjusted rearwardly until, when the knives are about half worn out, the axes of the idler pinions lie in the plane of the pins 342. Thus, adjustment of the knife brackets to compensate for wear of the knives does not move the idler pinions 352 toward or away from the double rack 358 sufficiently to affect the engagement of the teeth of the idler pinions with the teeth of the double rack.

The means by which the knives are moved downwardly into cutting position relative to the head 9 will now be explained. The mechanisms for moving each knife downwardly are similar and for convenience only the mechanism for moving one knife is illustrated and described in detail. A pair of coaxial pins 379 (Figs. 3 and 16) are fixed one in either side of the upper portion of the knife frame 344 and pivot in swinging end portions of forwardly extending arms of a pair of bell-crank levers 380 (only one lever being illustrated in the figures). Each bell-crank lever 380 is pivoted at its elbow on one of a pair of coaxial pins 382 fixed each in one of a pair of upwardly extending lugs 384 (lying one behind the other in Fig. 3) formed in the sliding head 9.

Cylindrical heads 386 (Fig. 16) of coaxial pins, fixed one on each side of the sliding head 9, engage parallel slots 388 formed one in each side of the lower portion of the knife frame 344. The arrangement is such that rocking of the bell-crank levers 380 through a small angle, by means hereinafter described, causes the knife frame to move in a direction substantially perpendicular to the plane of the guideways 10 in which the sliding head 9 slides.

Downward movement of the knife frame 344 is limited by abutments 390 formed in the upper portions of the slots 388 engaging the heads 386. As will be more fully explained hereinafter, these abutments determine the cutting plane in which the knives operate, and hence the plane to which the shearing block 20 is adjusted by means of the knurled head 260.

Each bell-crank lever 380 has a downwardly extending arm pivotally connected at 381 to the forked forward end portion of one of a pair of yielding links 392. The forked rearward end of each yielding link is pivotally connected to the swinging end of one of a pair of cam levers 394. Each cam lever 394 extends forward and downward, having a cam roll 396 rotatably mounted between its ends and having its rearward end pivoted on a shaft 397 fixed in the sliding head 9. The shaft 397 lies above the cam shaft 314 and parallel to it.

Each cam roll 396 engages a cam track 398 formed in one of the pair of cams 400, mentioned above, which are mounted on the cam shaft 314, one near the right end of the shaft and the other near the left.

Each yielding link 392 has a forward forked portion 402 having a hollow shank 404 and a rearward forked portion 406 having a shank 408 which slides within the hollow shank 404. A spring 410 surrounding the shank 408 is compressed between a shoulder 412 formed within the hollow shank 404 and a block 414 fixed to the end portion of the shank 408. Axial movement of the forked portion 402 relative to the forked portion 406 under the influence of the spring 410 is limited by a nut 416 threaded on the shank 408 engaging the end of the hollow shank 404. This nut is secured by a locknut 418.

The arrangement is such that when the machine is at rest the cams 400, by means of the cam levers 394, yielding links 392, and bell-crank levers 380, hold the knife frame 344 in a raised inoperative position. When the machine is started, the cams 400 rock the bell-crank levers 380 until the abutments 390 meet the heads 386, whereupon the springs 410 yield. The abutments 390 remain pressed against the heads 386 to locate the knives accurately as the sliding head 9 moves rearward carrying the knives rearward in their cutting movement. Thereafter the cams 400 act to raise the knife frame 344, the knives being raised into their inoperative position before the sliding head 9 has completed one third of its return movement. The timing of the movements of the knives will be more fully explained hereinafter.

Figure 19:
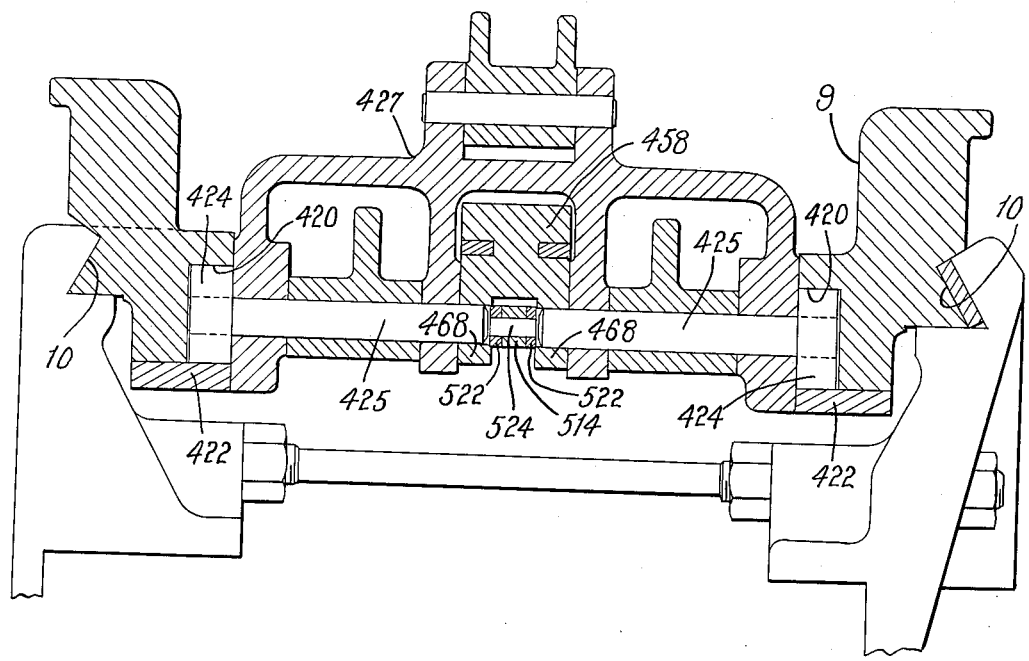
Fig. 19 is a section along the line XIX—XIX of Fig. 18.
Figure 21:
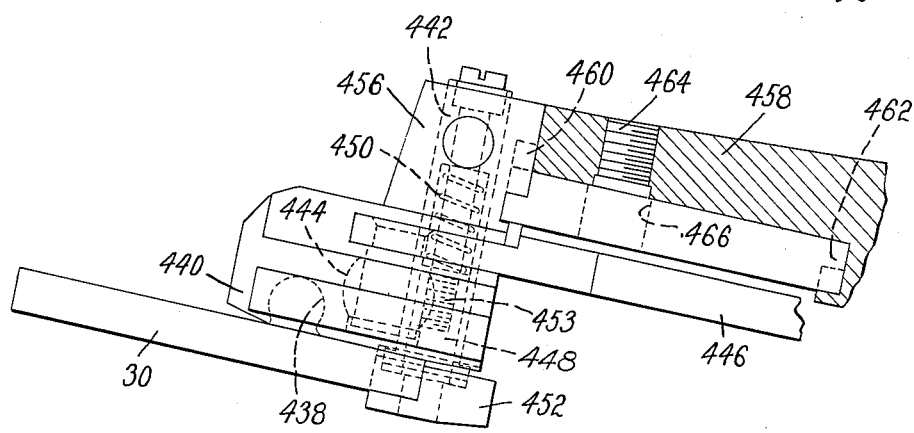
Fig. 21 is a view, partly in section, on an enlarged scale of the toe wipers shown in Fig. 20.

Whereas the knives are mounted directly in the head 9 to move as a unit therewith, the toe gage 26, the insole roll 28, the toe spreaders 30, and the side spreaders 32 are mounted in a separate carriage 427 (Figs. 18 and 19) which moves within the head and relative to it. The manner in which this carriage is mounted within the sliding head 9 will now be described.

Undersurfaces 420 formed in the sliding head 9 and upper surfaces of a pair of plates 422 fixed to the sliding head 9 cooperate to form guideways for four rolls 424 rotatably mounted on two pairs of coaxial pins 425 and 426 fixed in the carriage 427. The undersurfaces 420 and the plates 422 are parallel to the guideways 10 so the carriage 427 may move relative to the sliding head 9, parallel to the guideways 10.

The rearward end of the carriage 427 is pivotally connected to the forward end of a link 428, the rearward end of which is pivotally connected to the lower end of a cam lever 430 (Fig. 2a). The upper end of this cam lever is pivoted on the sliding head 9, and a cam roll 432 rotatably mounted between the ends of the cam lever engages a cam track 434 formed in the right-hand side of a cam 436 fixed to the cam shaft 314 mentioned above.

The toe spreaders 30 (Figs. 20, 21, 22 and 23) lie to the rear, i. e., the right (as seen in Figs. 28 to 33) of the knives 22 and 24, and each of the toe spreaders 30 is in the form of a narrow curved plate with a flat work-engaging undersurface and one edge curved to conform to the outline of the toe of an insole. Extending widthwise of each toe spreader 30, and formed upon the upper surface thereof, is a cylindrically shaped rib 438 which is assembled in a complementary recess formed in the under side of a carrier 440 for each of the toe spreaders. The two carriers 440 are mounted for swinging movement on parallel hollow pivot pins 442 and at their outward sides are connected by ball joints 444 to the forward ends of actuating links 446. The hollow pins 442 are relatively short in length and each houses a plunger 448 (Fig. 23). Each plunger 448 is urged downward by a spring 450 and has its lower end fixed in a member 452. This member is a plate shaped like a kidney having a flat undersurface. Downward movement of the kidney-shaped member 452 under the influence of the springs 450 is limited by screws 453 each threaded in the upper end of a plunger 448, the heads of these screws engaging upper end faces of the hollow pins 442.

Each toe spreader 30 has an arcuate recess 454 at one end arranged to conform to the adjacent end of the kidney-shaped member as the carriers 440 swing about the pivot pins 442 under the influence of the links 446. The arrangement is such that rocking of the toe spreaders 30 about their ribs 438 and yielding of the spring-loaded kidney-shaped member 452 allows the flat undersurfaces of the toe spreaders and kidney-shaped member to present a substantially continuous work-engaging surface to surfaces of a shoe which may be somewhat rounded or irregular when the toe spreaders are moved to engage the shoe. The manner in which the toe spreaders engage the shoe will be explained hereinafter.

The hollow pivot pins 442 are fixed in a rocker block 456 carried on the forward end portion of a spreader carrier 458. An arcuate tongue 460 formed in the forward end of the spreader carrier 458 engages a complementary groove formed in the rocker block 456 and an arcuate tongue 462 formed in the rearward end of the rocker block 456 engages a complementary groove formed in the spreader carrier 458. The head of a screw 464 threaded in the spreader carrier 458 engages the sides of a short laterally extending slot 466 formed in the rocker block 456. This screw 464 retains the rocker block 456 on the spreader carrier 458 while allowing the rocker block to rock on the arcuate tongues 460 and 462. This rocking of the rocker block 456 allows the toe spreaders 30 to accommodate themselves to work which is thicker on one side than the other, or work having an upper surface which is tilted a small amount laterally.

A pair of lugs 468 (Figs. 19 and 20) extend downwardly from the intermediate portion of the spreader carrier 458 and are pivoted on the inward end portions of the coaxial pins 425. Thus the spreader carrier 458 can rock about the pins 425 to raise or lower the toe spreaders.

The rearward end of the spreader carrier 458 is pivotally connected to the lower end of a link 470 the upper end of which is pivotally connected to the end of a forwardly extending arm of a cam lever 472 pivoted on the shaft 397. A cam roll 474 rotatably mounted on a downwardly extending arm of the cam lever 472 engages an outwardly facing cam track 476 formed on the left side of the cam 436. The arrangement is such that the cam track 476 lifts the toe spreaders positively away from the works at desired times, but downward movement of the toe spreaders 30, to press them against the work, is imparted by a spring 478. The cam track 476 is wider at certain locations along its path to permit the cam roll to move out of engagement with the sides thereof under the influence of the spring 478. The lower end of the spring 478 is anchored to the sliding head 9 and a loop formed in the upper end of the spring engages a helical groove 480 formed in an adjusting bar 482. The adjusting bar 482 has a knob 483 fixed to its rearward end and is rotatable in two lugs 484 and 486 carried by the cam lever 472. The lug 484 extends to the left of an intermediate portion of the cam lever 472 and the lug 486 extends to the left of a rearwardly extending arm of the cam lever 472. The arrangement is such that rotation of the knob 483 causes the helical groove 480 to move the upper end of the spring 478 toward or away from the shaft 397 about which the cam lever 472 rocks, and hence decreases or increases the force with which the spring 478 presses the toe spreaders 30 against the work and causes the cam roll 474 to move away from the cam track 476.

To open and close the toe spreaders 30 about the pivot pins 442 the rearward ends of the actuating links 446 are pivotally connected to lugs 488 extending downward one on either side of a slide block 490. The slide block 490 slides in a guideway 492 formed beneath the rearward portion of the spreader carrier 458 and is retained in position by a cover plate 494 fixed to the spreader carrier. Thus sliding movement of the slide block 490 in the guideway 492 causes the actuating links 446 to swing the toe spreaders toward and away from each other about the pivot pins 442.

Sliding movement is imparted to the slide block 490 by links 496 which lie one on either side of the slide block and the forward ends of which are pivoted on opposite ends of a pin 498 fixed transversely through the lug 488 in the slide block. The rearward ends of the links 496 are pivotally connected to the upper portion of a forked bell-crank lever 500 pivoted at its elbow on coaxial pins 502 fixed one in each of a pair of downwardly extending lugs 504 (Fig. 24) formed in the carriage 427. The forked bell-crank lever 500 straddles a cam plate 506. The cam plate 506 is fixed to the frame 2 and lies parallel to the guideways 10. A cam roll 508 rotatably mounted between rearward portions of the bell-crank lever 500 engages a cam slot 510 formed in the cam plate 506. The arrangement is such that when the machine is at rest the slide block 490 is in its most forward position and the swinging ends of the toe spreader are close together. The insole roll 28 is between the toe spreaders, as will be more fully explained hereinafter. When the carriage 427 moves rearward under the action of its cam track 434 (Fig. 2a), the cam slot 510 rocks the bell-crank lever 500 and (through the links 496, slide block 490 and links 446) swings the toe spreaders outwardly away from each other about the pivot pins 442. The length and positioning of the links 496 is such that rocking of the spreader carrier 458 does not cause appreciable opening or closing of the toe spreader 30.

The cam slot 510 is parallel to the guideways 10 for the greater part of its length, only its forward portion being inclined upwardly. The arrangement is such that when the machine is at rest the toe spreaders are held in a raised position by the cam track 476 and are held closed toward each other by the cam slot 510, there being just room between their swing ends for the insole roll 28. The toe spreaders 30 are in their most forward positions since the carriage 427 and the sliding head 9 are each in their most forward positions.

The way in which the toe spreaders operate on a shoe will now be explained. Figs. 28 through 33 show the positions of the toe spreaders, side spreaders and knives relative to the work piece and matrix as a shoe is trimmed. The fold supporting lugs 293 shown in Fig. 35 are not shown in Figs. 28 to 33 for the sake of simplicity. When the machine is in operation the cam track 476 allows the toe spreaders to descend under the influence of the spring 478 and engage the toe portion of the insole of a shoe positioned sole upward in the machine. This descending movement of the toe spreaders commences when the main shaft 6 has turned through about 5° and is complete by the time the main shaft has turned through 25°. The toe spreaders are swung close to each other (leaving just enough room between them for the insole roll 28) in order to pass freely down to the insole within the upturned margins of the toe portions of the shoe upper materials.

When the main shaft 6 has turned through 25° the cam track 434 commerces to move the carriage 427 rearward, bringing it to rest when the main shaft has turned through about 55°. This movement of the carriage 427 causes the toe spreaders to sweep rearward, the cam slot 510 causing them simultaneously to swing open away from each other. During these rearward and opening movements the toe spreaders 30 move beyond the toe of the insole carrying with them marginal portions of the shoe upper materials which they spread out above the matrix 33. Should the toe portion of the insole be tilted somewhat relatively to the plane of the guideways 10, the spring 478 allows the toe spreaders to rise as they ride over the insole. When the toe spreaders 30 have taken up a position above the matrix 33 of the wiper plate 18, the cam track 476 allows the spring 478 to move the toe spreaders downward toward the wiper plate 18, which starts to rise when the main shaft 6 has turned through 45°. Thereafter, the toe spreaders are firmly pressed against the work by the spring 478, marginal portions of the upper materials being gripped between the toe spreaders and the wiper plate. As the wiper plate and shearing block continue to rise, the upper materials around the toe of the last are tensioned until the main shaft 6 has turned through 105° when the shearing block 20 reaches the plane in which the knives will move to trim the work and the undersurfaces of the toe spreaders 30 rest flush upon the work overlying hte matrix. During this upwiping movement of the wiper plate 18 the toe spreaders 30 are lifted against the resistance of the springs 478. Thereafter the toe spreaders 30 dwell on the work until the sliding head commences to move rearward under the action of its cam track 310. The cam roll 508 remains in the straight portion of the cam slot 510 and the toe spreaders remain fully open from the time the main shaft 6 has turned through 55° until it has turned through 324°.

As the sliding head 9 commences to move rearward under the action of the cam track 310 the cam track 476 lifts the toe spreaders 30 slightly to ensure that they clear the shearing block 20. This lifting of the toe spreaders is a precaution lest toe portions of the upper materials fail to cover the shearing block.

After this slight lifting of the toe spreaders is complete, they continue rearward, the sliding head 9 and the carriage 427 moving bodily together.

The cam track 476 commences to lift the toe spreaders 30 further just before the sliding head reaches its rearmost position, and the toe spreaders reach their inoperative upper positions just after the commencement of the return forward movement of the sliding head. When the toe spreaders have reached their inoperative upper positions and during the return movement of the sliding carriage, they are moved forwardly relative to the sliding head by movement of the carriage 427.

When the main shaft 6 has turned through 324° the cam slot 510 commences to close the toe spreaders together and the toe spreaders are fully closed in toward each other (one on either side of the insole roll 28) by the time the sliding head 9 and carriage 427 come to rest, that is, when the main shaft has turned through 355°. The timing of the movements of the toe spreaders 30 with regard to other instrumentalities of the machine will be more fully described hereinafter.

The toe gage 26 (Figs. 18, 20 and 24) constitutes an abutment against which the toe of a shoe is initially clamped by the heel abutment 14. Before the trimming operation begins the toe gage occupies a position just above the wiper plate 18 and consequently must be retracted when the wiper plate rises. Accordingly, the toe gage is connected to and actuated by the slidable carriage 427 so as to be withdrawn just prior to the upward movement of the wiper plate.

The shoe contacting portion of the toe gage 26 comprises the end surface of the head of a bolt 512 threaded in a gage block 514 supported on trunnion pieces 516 the heads of which engage the walls of parallel slots 518 (Fig.18) each formed in one of a pair of forward extensions 520 of the carriage 427. The rearward end of the gage block 514 is embraced by a fork 522 projecting forward from the slide block 490 and is pivoted on a pin 524 fixed in this fork. The fork 522 lies between the lugs 468 and, when the slide block 490 is in its forward position relative to the spreader carrier 458, the pin 524 is coaxial with the pins 425. Thus rocking of the spreader carrier 458 to raise or lower the toe spreaders 30 does not move the toe gage 26 from its forward position.

The forward end of a leaf spring 526 (Fig. 20) engages the uppermost flat on the head of the toe gage bolt 512 and secures the bolt against inadvertent rotation from a desired position. The intermediate portion of the leaf spring 526 is compressed beneath the shanks of the trunnion pieces 516, and displacement of the spring is prevented by a pin 528 fixed in the gage block 514 engaging a hole in its rearward end.

Before trimming is begun the operator adjusts the machine to accommodate a particular size shoe in the following manner: When the machine is at rest the toe gage 26 is in its forward position and the operator turns the bolt 512 until a shoe, thereafter held against it by the heel abutment 14 and held in position by the toe rest 16 against the bottom plate 12 and insole roll 28, is in correct position to be engaged by the wiper plate 18 when the wiper plate rises.

When the machine is started the toe gage 26 remains stationary until the main shaft 6 has turned through 25° when it is carried rearward by movement of the carriage 427. This rearward movement of the carriage 427 causes the cam slot 510 to impart additional rearward movement to the slide block 490 and hence to the toe gage 26. The toe gage is thus moved to the rear of the wiper plate 18 and the shearing block 20 so that, when they rise into their operative positions under the influence of the cam track 250, the toe gage enters the clearance slot 297 in the slide 200. When the sliding head 9 moves rearward it carries with it the toe gage 26, and the toe gage is not returned to its forward position until the wiper plate 18 and shearing block 20 have descended to an inoperative position. The timing of the movements of the toe gage 26 will be more fully described hereinafter.

In order to provide the maximum support to the shoe bottom in cooperation with the bottom plate 12, the insole roll 28, mentioned previously, is placed as near to the toe end of the insole as is practicable without obstructing other instrumentalities of the machine. When the machine is at rest the insole roll 28 lies between the swinging ends of the toe spreaders 30 and just in front of the kidney-shaped member 452. The insole roll is retracted from its toe supporting position by the rearward movement of the carriage 427 as is the toe gage 26.

The insole roll 28 (Figs. 18 and 24) is rotatably mounted between the arms of a fork formed in the lower end portion of a slide 530 movable in slideways 532 formed in the forward end portion of a lever 534. This lever 534 is pivoted between its ends on an intermediate portion of a pin 536 fixed in a pair of lugs 538 formed in the upper forward portion of the carriage 427. The slide 530 is adjustable heightwise in the lever 534 by means of an adjusting screw 540 threaded in the lever with its head engaging a groove 542 formed in the slide 530.

Upward movement of the slide 530 in its slideways 532 is limited by an abutment 544 formed in the slide engaging an undersurface of the lever 534. This abutment, by limiting the height of the insole roll 28, prevents the shoe being held at such a height that the toe portion of the insole may be damaged by the knives 22 and 24.

The rearward end of the lever 534 is pivotally connected to the upper end of a short link 546 the lower end of which is pivotally connected to a stem 548 which is slidable in the rearward portion of the carriage 427. The lower end of the stem 548 extends below the carriage 427 and carries a fork 550 in which is fixed a horizontal pin 552. A roll 554 is rotatably mounted on the pin 552 between the arms of the fork 550, and two rolls 556 are rotatably mounted on the ends of the pin 552 one on each side of the roll 554 within the fork 550. The roll 554 is equal in diameter to each of the rolls 556.

The roll 554 is arranged to engage an upper cam surface 558 formed on the cam plate 506, and the rolls 556 are arranged to engage a rectilinear upper surface 560 formed on a cam piece 562 having a forked rearward end which embraces the forward end of the cam plate 506 and is pivoted on a horizontal pin 564 fixed in the cam plate 506.

The forward end of the cam piece 562 rests on an eccentric 566 fixed to a shaft 568 journaled in the frame 2. A swinging arm 570 (Fig. 2a) fixed to the right end of the shaft 568 carries a knob 752 connected to a spring plunger 574 arranged to engage any one of a series of holes 576 formed in the frame 2. The knob 572 may be used to rotate the eccentric 566 and secure it in any desired position, thus placing the forward end of the cam piece 562 in a desired heightwise position. A spring 577 secured between the rearward end of the carriage lever 534 and the carriage 427 urges the rolls 554 and 556 downward.

The arrangement is such that, when the machine is at rest, the spring 577 holds the rolls 554 and 556 pressed against the forward portion of the upper surface 560 of the cam piece 562. The cam piece 562 resists clamping pressure applied to the insole roll 28 when the heel abutment 14 and toe rest 16 press the shoe against the bottom plate 12 and insole roll. After the machine has been started the carriage moves rearward and the rolls 554 and 556 run freely over the surface 560 until they reach the forked rearward portion of the cam piece 562. Thereafter the rolls 556 support the insole roll 28 and the roll 554 is unsupported until it reaches the cam surface 558. When the rolls 556 pass rearward of the surface 560 of the cam piece 562, the insole roll 28 is supported only by the roll 554 bearing on the cam surface 558. The arrangement is such that whatever the angle of the cam piece 562, as determined by the eccentric 566, there is no shock as the roll 554 meets the cam surface 558, or as the rolls 556 meet the surface 560 when returning.

Movement of the carriage 427, which moves the toe spreaders rearward out of the way of the insole roll 28, brings the insole roll 28 rearward to support the extreme toe portion of the insole. In this position the insole roll 28 is located to support the shoe as the wiper plate 18 rises to wipe the upper around the toe of the last. Thereafter initial rearward movement of the sliding head 9 carries the insole roll 28 toward the toe end of the insole.

When the toe portion of the insole is parallel to the guideways 10, when the shoe is clamped in position, the knob 572 will be used to set the surface 560 also parallel to the guideways. This arrangement permits the insole roll to continue to support the shoe as it moves rearward following the toe spreaders 30. More commonly, the toe portion of the insole will be tilted slightly relative to the guideways 10 in a direction to raise the toe of the shoe and the slope of the surface 560 will be adjusted accordingly. Tilting of the toe portion of the insole is usual since the pulling-over tacks T must be kept sufficiently low to ensure that they do not foul the knives. However, the extreme toeward portion of the insole must be kept high if the maximum of material is to be trimmed away, since the biggest pleats tend to form here during lasting.

The insole roll 28 must be raised before it reaches the shearing block 20. The cam surface 558 is accordingly shaped to permit the spring 577 to raise the insole roll 28 as soon as the rolls 556 have passed rearward of the surface 560, that is, as soon as the insole roll 28 has passed rearward of the insole. The cam surface 558 permits the spring 577 to retain the insole roll 28 in its raised position until the carriage 427 approaches its forward position during return movement of the sliding head 9. The timing of the movements of the insole roll 28 will be more fully explained hereinafter.

The side spreaders 32 (Figs. 25, 26 and 27) are constructed and arranged to spread, outwardly over the matrix 33, side portions of the upper materials immediately toeward of the pulling-over tacks at the tip line, and thereafter to move immediately ahead of the cutting edges of the knives 22 and 24 as the knives trim the work. The side spreaders hold the upper materials against the matrix 33 as they are trimmed.

Each side spreader 32 provides an approximately triangular work-engaging undersurface, bounded by a concave edge 578, a wiping edge 579 and a third edge 580. Each wiping edge 579 tends to wipe upper materials of a shoe laterally over the matrix when the side spreaders move toewardly of a shoe. The work-engaging undersurface of each side spreader is flat over a substantial portion of its area but is curved upwardly at the angle between the concave edge 578 and the wiping edge 579 to enable the side spreader to ride smoothly over the upper materials as it initially moves laterally.

Each concave edge 578 is shaped to conform generally to the cutting edge of the adjacent knife and, although the diameter of each knife is reduced by repeated sharpenings, each knife is swung toward its respective side spreader when the knives are readjusted after sharpening to bring their cutting edges almost into contact. This readjustment enables the knife edges as they cut to remain close to the concave edges 578, whatever the size to which the knives are reduced, as the side spreaders follow predetermined paths of movement, as hereinafter described.

Those portions of the side spreaders which constitute the work-engaging undersurface are thin and plate-like and they overlap when the side spreaders are closed inward toward each other. When they overlap, the undersurface of the righthand spreader lies beneath the left, entering a clearance slot in the right side spreader (not shown in the drawing).

Each side spreader 32 lies below and is pivoted between its ends on the forward end of a link 581 having a forked rearward end which is pivoted on the forward end of one of a pair of side levers 582. Each side lever is pivoted between its ends on an intermediate portion of one of the pins 425 fixed in the carriage 427.

The rearward end of each side lever 582 is pivotally connected to one of a pair of links 584, the upper ends of which are connected by ball joints 586 (Fig. 2a) to opposite ends of a whiffletree 588. The whiffletree 588 is pivoted midway between the ball joints 586 on a pin 590 fixed in a downwardly inclined fork 592 formed in the forward end of a cam lever 594 an intermediate portion of which is pivoted on the shaft 397.

Rocking of the whiffletree 588 about the pin 590 allows the side spreaders 32 to bear evenly on a shoe which may vary in height a little from one side to the other. The amount by which the whiffletree can rock on the pin 590 is small, being limited by abutments 596 formed in the fork 592 engaging upper surfaces of the arms of the whiffletree.

A spring plunger 597 housed in the sliding head 9 urges one arm of the whiffletree 588 against its abutment 596 at a time when the side spreaders are moving inward toward each other and thus alines the side spreaders to ensure that the plate-like portion of the left spreader enters the clearance slot in the right.

A cam roll 598 (Fig. 2a) rotatably mounted on a downwardly extending arm of the cam lever 594 engages a cam track 600 formed in the right side of a cam 602 fixed to an intermediate portion of the cam shaft 314 to the right of the cam 436. The cam track 600 acts to lift the side spreaders 32 which are urged downward to press against the work by a spring 604. The lower end of the spring 604 is anchored to the sliding head 9 and a loop formed in the upper end of the spring engages a helical groove 606 formed in an adjusting bar 608. This adjusting bar has a knob 610 fixed to its rearward end and is rotatable in two lugs 612 and 614 on the lever 594. The lug 612 is located to the right of an intermediate portion of the cam lever 594 and the lug 614 is located to the right of the end of a rearwardly extending arm of the cam lever 594. The arrangement is such that rotation of the knob 610 causes the helical groove 606 to move the upper end of the spring 604 toward or away from the shaft 397 about which the cam lever 594 rocks, and hence decreases or increases the force with which the spring 604 presses the side spreaders 32 against the work when the cam roll 598 enters an enlarged portion of the cam track 600.

Movement of the carriage 427 and sliding head 9 will move the side spreaders 32 in the direction in which the knives 22 and 24 move to trim a work piece, and the cam track 600 will lift the side spreaders 52 away from the plane in which the knives move to trim a work piece, or will allow the spring 604 to move the side spreaders toward this plane. The timing of the movements of the side spreaders 32 will be explained hereinafter.

To help insure that any pleat that may be present in the most toeward portions of the outspread upper materials does not remain upstanding, as these most toeward portions are trimmed, a presser block 375 (Figs. 17, 17a and 17b) is arranged to move immediately ahead of the knives and to press down upon the upper materials lying on the center line between the spaced-apart side spreaders. This presser block is mounted between the side spreaders on the under side of the forward end of a spring member 376 secured to the knife frame 344 at the top horizontal surface of the chip clearance slot 372. The rear portion of the under surface of the presser block 375 is curved on each side, as indicated at 378, to aid in deflecting chips toward the chip clearance slot. A clearance slot 377 is provided in the presser block to accommodate tip portions of the side spreaders at one period in the cycle.

Figure 28:
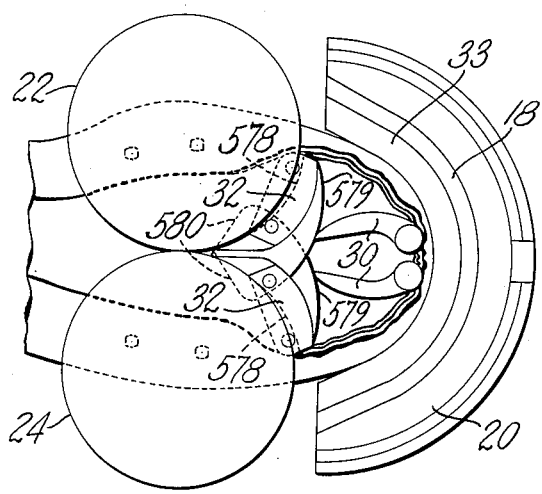
Figs. 28 through 33 are schematic plan views showing the relative positions of the toe spreaders, the side spreaders, and the trimming knives during various stages of the trimming operation.

With the machine parts positioned to receive a work piece, the side spreaders 32 lie side by side above the rearward periphery of the knives, the rearward ends of the side spreaders being closed in toward each other. When the machine is started the side spreaders move rearward clear of the knives and descend on to the insole of the shoe within the upturned margins of the upper materials (Fig. 28). Thereafter the side spreaders swing apart and spread outwardly (Figs. 30, 31 and 32) over the matrix 33 side portions of the upper materials immediately toeward of the pulling-over tacks. On completion of this movement the side spreaders lie in close proximity to the cutting edges of the knives, the knives having descended into their cutting plane.

The mechanisms controlling the swinging movements of the two side spreaders 32 are similar and for convenience only the mechanism controlling the right-hand spreader will be described in detail. The right-hand portion of the right side spreader 32 is pivotally connected to a corner of a triangular member 616, another corner of which is pivotally connected to a side lever 582. The triangular member lies below the forward end of this side lever. Its third corner is connected by a ball joint 618 to the forward end of a link 620 the rearward end of which is connected by a second ball joint 622 to a downwardly extending arm of a bell crank 624 which is pivoted at its elbow on a horizontal pin 626 fixed in two lugs 628 extending upward from the forward portion of the side lever 582. The bell crank 624 lies between the lugs 628 with its downwardly extending arm passing through a clearance hole 630 in the side lever 582. The rearwardly extending arm of the bell crank 624 is pivotally connected to a link 632 the upper end of which is pivotally connected to cam lever 634.

The cam lever 634 is pivoted between its ends on a pin 636 fixed in the sliding head 9 and has an arm extending forward and to the left which is connected by a second link 632, a second bell crank 624, a second link 620, and a second triangular member 616 to the left side spreader 32. Rocking of the cam lever 634 about the pin 636 imparts swinging movements to both side spreaders. Rocking movement is imparted to the cam lever 634 through a cam roll 640 which engages a cam track 638 formed in the left-hand side of the cam 602.

When the machine is started the side spreaders 32 are carried rearward clear of the cutting edges of the knives by movement of the carriage 427. This movement of the carriage 427 would cause the links 632 to swing the side spreaders if the cam lever 634 were held stationary, but the cam track 638 acts to rock the cam lever 634 slightly and thus prevent the side spreaders swinging as they are carried rearward by the carriage 427.

When the carriage has come to rest and the wiper plate 18 has started to wipe the upper materials upwardly around the toe of the last, the cam track 600 acts to allow the spring 604 to urge the side spreaders toward the work, the side spreaders being pressed against the insole at about the time that the wiper plate 18 completes its upward wiping movement.

As soon as the side spreaders 32 are pressed against the insole (Fig. 28) they swing outwardly away from each other (Fig. 30), under the influence of the cam track 638, to spread the upper materials on either side of the forepart of the shoe outwardly over the matrix 33. As the side spreaders thus start to swing outwardly the knives 22 and 24 start to descend under the action of the cam tracks 398 (Fig. 3), both movements ending simultaneously, the knives having reached the plane in which they move to trim the work and the side spreaders pressing the lining, box toe and upper downwardly against the matrix 33.

During the outward swinging of the side spreaders 32 they will normally rest on the lining and the cam roll 598 will be clear of the cam track 600. To prevent the side spreaders 32 from fouling the shearing block 20, should the machine be turned over by hand in the absence of a work piece, the cam track 600 acts to lift the side spreaders 32 so that their end portions pass freely over the shearing block.

Figure 32:
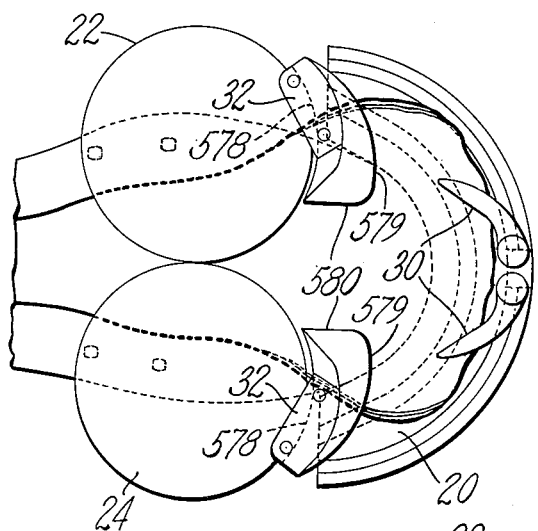
Figure 33:
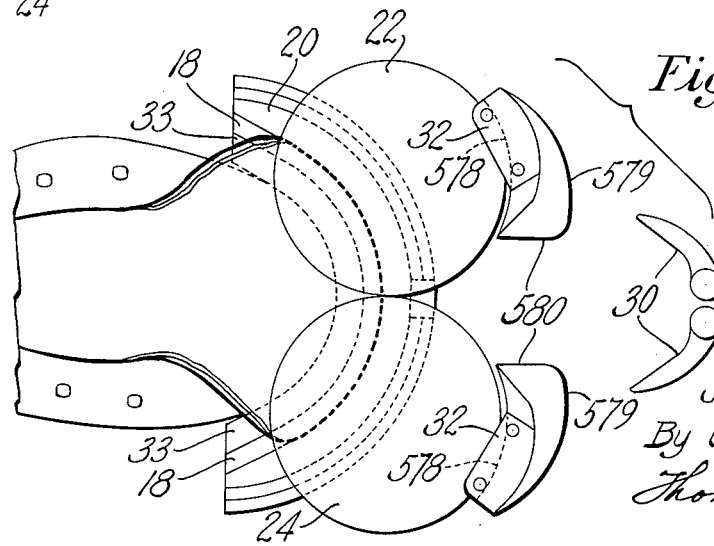

As soon as the knives have moved downwardly into the plane in which they move to trim the work, the sliding head 9 commences to move rearwardly imparting cutting movement to the knives (Fig. 32). As the knives and side spreaders commence their rearward movement, the concave edges 578 of the side spreaders are in close proximity to the cutting edges of the knives.

The arrangement is such that each side spreader as it moves rearwardly in a rectilinear path presses against the matrix 33 those portions of the upper materials about to be trimmed by the adjacent knife, except that the side spreaders, being spaced apart, will pass to either side of those portions of the upper materials lying at the extremity of the toe of the shoe. The wiping edges 579 of the side spreaders, by virtue of their inclination relative to the rectilinear path in which they move, tend to urge the upper materials they engage outwardly over the matrix. The wiping edges 579 thus tend to tension portions of the upper materials lying at the extremity of the shoe and tend, therefore, to prevent pleats remaining in these portions as they are being trimmed.

The cam track 638 moves the side spreaders inward to their fully closed position during the first part of the forward or return movement of the knives. The cam track 600 (Fig. 2a) commences to move the side spreaders into their raised position before the knives have quite completed their rearward movement, and they are fully raised before they have started to overlap, thus permitting the spring plunger 597 to aline the plate-like portion of the left side spreader with the slot in the right side spreader which it enters. Forward movement of the sliding head 9, and of the carriage 427, relative to the sliding head restores the side spreaders to their starting positions above the rearward portions of the knives.

Figure 38:
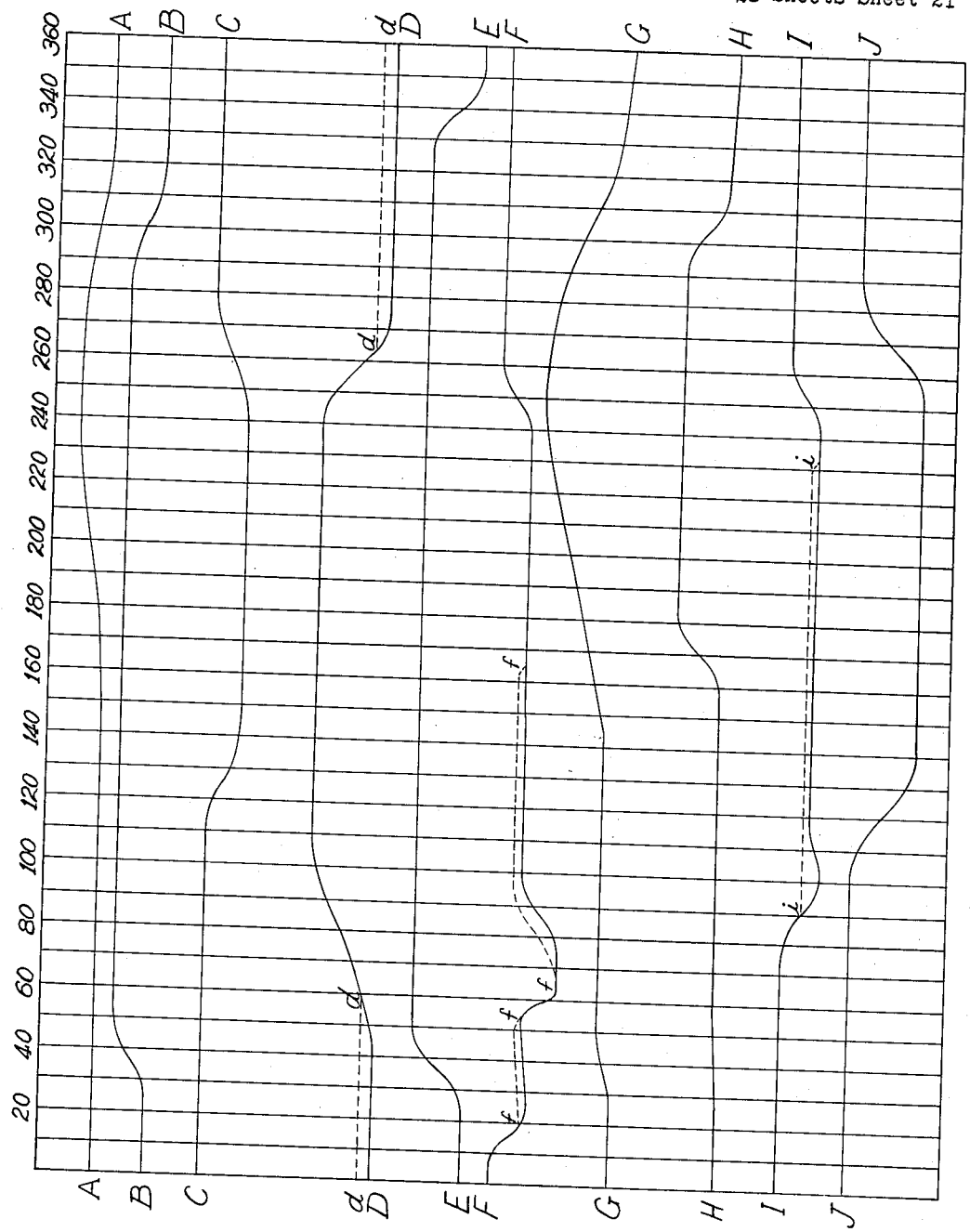
Fig. 38 is a chart showing the relative timing of the various instrumentalities of the machine.

The timings of the movements of the knives 22 and 24, wiper plate 18, toe gage 26, insole roll 28, toe spreaders 30, and side spreaders 32 relative to the sliding head 9 and the carriage 427 will now be described with reference to Fig. 38. Fig. 38 is a timing diagram in which measurements along the horizontal axis represent degrees of rotation of the main shaft 6 during a trimming cycle and the amounts of movement of the various instrumentalities are represented by measurements along the vertical axis.

In considering the movements of the instrumentalities of the machine it is convenient first to consider the movements of the sliding head 9 and carriage 427 in which certain instrumentalities are mounted. In Fig. 38 the line AA represents the successive positions of the sliding head 9 and the line BB represents the successive positions of the carriage 427 relative to the sliding head 9 as the main shaft 6 makes one complete turn from its stopped position.

Considering first the line AA, when the clutch is tripped the sliding head remains in its forward position until the main shaft has turned through 145°. The sliding head then moves rearwardly and returns without a pause, reaching its extreme rearward position when the main shaft has turned through 250° and regaining its extreme forward position when the main shaft has turned through 355° and is about to come to rest.

Considering the line BB, it will be seen that when the clutch is tripped the carriage 427 remains in its forward position within the sliding head until the main shaft has turned through 25°. The carriage then moves rearward, reaching its extreme rearward position relative to the sliding head when the main shaft has turned through 55°.

The carriage remains at rest relative to the sliding head 9 while the sliding head carries it rearwardly and starts to return. When the main shaft has turned through 285°, however, the carriage starts to move forward and it reaches its fully forward position, relative to the sliding head, when the main shaft has turned through 325° and before the sliding head has fully returned to its forward position.

Considering the movements of the knives 22 and 24, the line CC in Fig. 38 represents successive positions of the knives as they move downward into and then away from the plane in which they move to trim the work. Knife movements along the cutting plane are represented by the line AA since the knives move with the sliding head 9.

It will be seen that when the machine is started the knives are in a forward and upward position. When the main shaft has turned through 110° the knives start to move downwardly into their cutting plane. When the knives reach their cutting plane (see line CC), the main shaft having turned through 145°, they start their rearward trimming movement (see line AA). By the time the main shaft has turned through 240° trimming is complete (though the sliding head has not quite reached its rearmost position) and the knives start to move upward away from their cutting plane. The knives reach their uppermost position when the main shaft has turned through 280° and are thereafter returned to their forward position by the returning sliding head.

Considering the movements of the wiper plate 18, its matrix 33 and the shearing block 20, the line DD denotes successive positions of the wiper plate as it is moved through its full range of travel by the cam track 250. It will be seen that the wiper plate remains in a downward position from the time the clutch is tripped until the main shaft has turned through 45°. It then starts to rise and reaches its uppermost position when the main shaft has turned through 105°. Downward return movement of the wiper plate commences when the main shaft has turned through 240° and is completed when the main shaft has turned through 276°.

The dotted lines dd show successive positions of the wiper plate 18 resulting from a typical setting of the knurled head of screw 298 (Fig. 12) which is provided to modify the movements of the wiper plate. When the machine is at rest the wiper plate is held above its lowest position, commencement of its upward movement is delayed until the main shaft has turned through 65° rotation, the extent of its wiping movement is lessened, and the completion of downward movement is advanced, taking place when the main shaft has turned through 264°.

Considering the movements of the toe spreaders 30, the line EE denotes successive positions of the toe spreaders as they open and close and the line FF denotes successive positions of the toe spreaders as they move in a direction perpendicular to the plane of the guideways 10 under the influence of the cam track 476 (Fig. 20). Normally certain portions of the cam track 476 will be inoperative, the cam roll 474 being held clear of the cam track 476 by a work piece lifting the toe spreaders. The line FF therefore represents the condition when the illustrative machine is turned over by hand in the absence of a work piece.

The dotted lines ff represent successive positions of the toe spreaders 30 when they are lifted by one particular work piece of normal thickness, against the resistance of the spring 478, and the cam track 476 is inoperative. Movements imparted to the toe wipers by the carriage 427 and the sliding head 9 are represented by the lines AA and BB.

When the clutch is tripped the toe spreaders 30 are closed together and are in a raised forward position. When the main shaft has turned through 5° they commence to descend toward the work and are pressed against the insole (see line FF) when the main shaft has turned through about 20°, the cam track 476 becoming inoperative. When the main shaft has turned through 25° the toe spreaders commence to open away from each other (see line EE) and to move rearwardly (see line BB), to spread the upper materials outwardly over the matrix 33.

On sliding rearwardly off the toe of the insole, when the main shaft has rotated through about 44°, the toe spreaders again come under the control of the cam track 476. The toe spreaders cease to move rearward when the main shaft has turned through 55° (see line BB), being fully opened out (see line EE) above the matrix 33.

The cam track 476 continues to lower the toe spreaders until the rising matrix 33 presses the outspread lining, box toe and upper against them, and lifts them to render the cam track 476 again inoperative when the main shaft has turned through about 70°. The time at which the matrix commences to lift the toe spreaders will vary a little according to the thickness of the work piece and the heightwise setting of the matrix 33 relative to the shearing block 20.

The toe spreaders 30 press the upper materials against the matrix to assist the wiper plate 18 in its upwiping action and thereafter remain pressed against the work until initial rearward movement of the sliding head 9 (see line AA) carries them rearward of the work (see line FF) and the cam track 476 again becomes operative. The cam track 476 ensures that the toe spreaders clear the matrix and shearing block should the illustrative machine be turned over by hand in the absence of a work piece.

The toe spreaders commence to move upwardly into their inoperative position when the main shaft has turned through 240°, this upward movement being complete when the main shaft has turned through 265°. The toe spreaders commence to close in together when the main shaft has turned through 324°, this closing movement being complete when the main shaft has turned through 355°.

Considering the movements of the toe gage 26, the line GG of Fig. 38 represents successive positions of the toe gage. When the clutch is tripped the toe gage is in its extreme forward shoe-engaging position. Movement of the carriage 427 (see line BB) causes it to move rearwardly early enough at 25° rotation of the main shaft and far enough to clear the rising shearing block (see line DD). Thereafter the toe gage moves further rearward at 145° rotation of the main shaft with the carriage 427 and sliding head 9 and is returned to its forward operative position when the shearing block has descended into its inoperative position.

Considering the movements of the insole roll 28, the line HH in Fig. 38 represents successive positions of the insole roll as it moves toward and away from the plane of the guideways 10. Since the insole roll is carried on the carriage 427, the lines AA and BB give the successive positions of the insole roll as it is moved by the carriage and sliding head 9.

Figure 24:
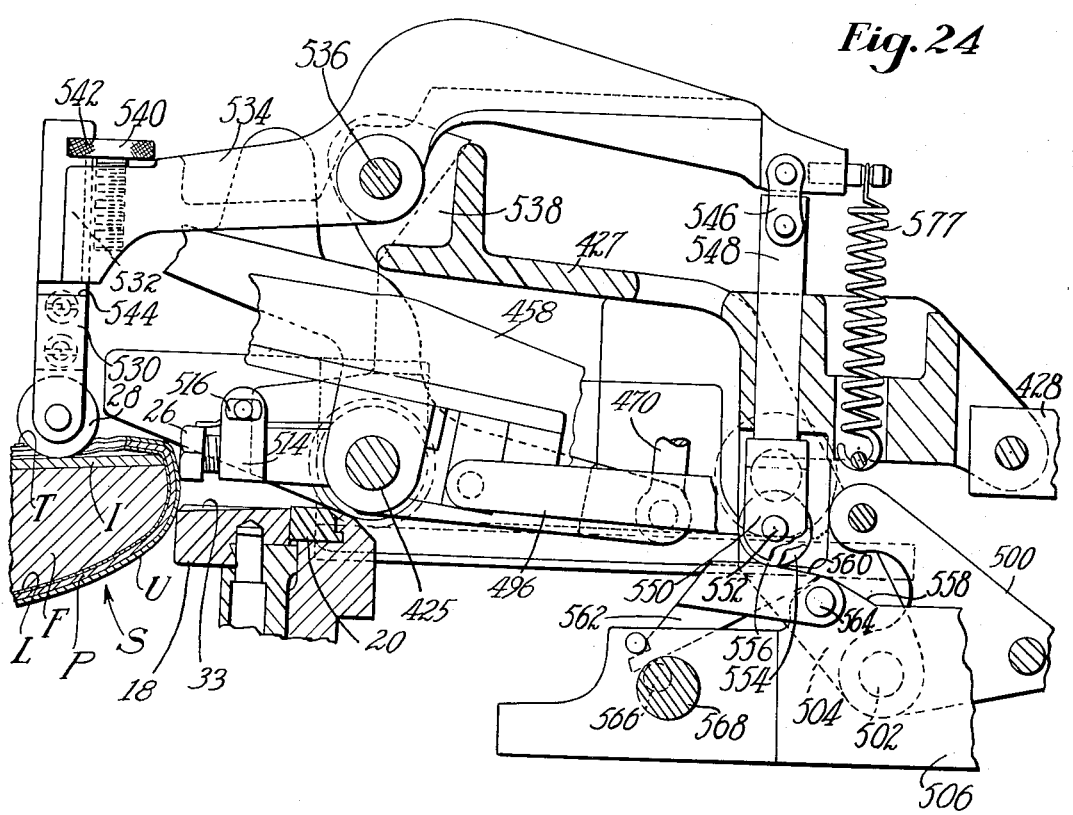
Fig. 24 is a right side elevation, partly in section, of the toe gage and the insole roll and their associated operating mechanisms.

When the clutch is tripped the insole roll is in its most forward position supporting the insole. When the main shaft has turned through 25° the carriage 427 (see line BB) moves the insole roll rearward until the insole roll approaches the tip of the toe of the insole where it comes to rest after the main shaft has turned through 55°. During this movement the insole roll maintains contact with the insole and, on a normal insole, the insole roll rises slightly under the influence of the surface 560 (Fig. 24). The amount of the rise depends on the setting of the eccentric 566. The insole roll continues to support the insole during the upwiping action of the wiper plate 18 and thereafter is moved rearward of the insole by the initial rearward movement of the sliding head 9 (see line AA). As the insole roll leaves the insole it is lifted by the spring 577 as the roll 554 rides on the cam surface 558 so that it passes clear above the shearing block 20 as it is carried further rearward by the sliding head. Return movement of the carriage 427 and sliding head 9 causes the surfaces 558 and 560 to restore the insole roll to its initial position.

Considering the movements of the side spreaders 32, the full line II in Fig. 38 represents successive positions of the side spreaders as they move toward and away from the plane of the guideways 10 under the action of the cam track 600. The dotted line ii represents the successive positions of the side spreaders as they press against the work, the cam track 600 being then inoperative.

The line JJ represents successive positions of the side spreaders 32 as they swing together and apart under the influence of the cam track 638. Since the side spreaders are carried on the carriage 427, the lines AA and BB give the successive positions of the side spreaders 32 as they are moved by the carriage 427 and sliding head 9.

When the clutch is tripped the side spreaders 32 are in a raised inoperative position (see line II) above rearward portions of the knives and are fully closed in toward each other (see line JJ). In this raised inoperative condition they are carried rearward of the knives (see line BB) as the toe spreaders 30 sweep the toe portions of the lining, box toe and upper outwardly away from the shoe and over the matrix 33. When the main shaft 6 has turned through 75°, about the time the toe spreaders are pressing the upper materials against the matrix 33, the side spreaders start to descend and they are pressed against the insole (see dotted line ii) as the wiper plate 18 completes its upwiping action (see line DD). When the main shaft has turned through 105°, the wiper plate having reached its uppermost position and the knives being about to move downward (see line CC), the side spreader commences to swing outwardly spreading side portions of the lining, box toe and upper over the matrix 33. When the main shaft has turned through 145° the side spreaders become fully spread apart, the knives reaching their operative position simultaneously.

It will be seen from the lines II and JJ that, should the main shaft be turned by hand in the absence of a work piece, the cam track 600 will lift the side spreaders 32 sufficiently to clear the shearing block 20 as they swing apart to approach it.

As the knives commence their cutting movement (see line AA) the concave edge 578 (Fig. 32) of each side spreader lies close to the cutting edge of the adjacent knife, and each side spreader presses down against the matrix 33 those portions of the upper materials which are just about to be trimmed.

The side spreaders remain fully spread apart until the sliding head has carried them beyond the work. When the main shaft has turned through 240°, that is, just before the sliding head reaches its rearmost position, the cam track 600 commences to lift the side spreaders. As the sliding head 9 reaches its rearmost position the cam track 638 commences to swing the side spreaders inward toward each other, the side spreaders being fully closed in together and overlapping by the time the main shaft has turned through 290°. The cam track completes the raising of the side spreaders when the main shaft has turned through 265° and thus ensures that, before the inward swinging of the toe spreaders causes them to overlap, the spring plunger 597 alines the plate-like portion of the left-hand side spreader with the clearance slot in the right-hand side spreader.

Having thus described our invention, what we claim as new and desire to secure by Letters Patent of the United States is:

1. A machine for trimming surplus upper materials from the toe of a shoe having, in combination, means for supporting the shoe bottom upward, means movable in a path lengthwise of the shoe for trimming the surplus materials, a matrix on which portions of the upper materials are supported in outspread condition while being trimmed, means for moving the matrix upward toward the path of the trimming means, first spreading means for spreading portions of the upper materials at the most toeward end of the shoe outwardly over the matrix, second spreading means for spreading toe portions of the upper materials at opposite sides of the toe contiguous with the materials spread by said first spreading means outwardly over the matrix, and means for causing said first spreading means to press the outspread upper materials against the matrix.

2. A machine for trimming surplus upper materials from the toe of a shoe containing a last having, in combination, means for supporting the shoe bottom upward, means movable in a path lengthwise of the shoe for trimming the surplus materials, a toe wiper surrounding the toe of the shoe movable heightwise thereof and having a beveled trimming matrix, means for moving the toe wiper upward toward the path of the trimming means, means for spreading portions of the upper materials outwardly over the matrix, and means for causing the spreading means to press the outspread materials against the upward moving matrix and to move upward therewith whereby tension is applied to the upper materials on the last.

3. A machine for trimming surplus upper materials from the toe of a shoe having, in combination, means for supporting the shoe bottom upward, means movable in a path lengthwise of the shoe for trimming the surplus materials, a matrix on which portions of the upper materials are supported in outspread condition while being trimmed, means for moving the matrix upward toward the path of the trimming means, first spreading means for spreading portions of the upper materials at the most toeward end of the shoe outwardly over the matrix, and second spreading means for spreading toe portions of the upper materials at opposite sides of the toe contiguous with the materials spread by said first spreading means outwardly over the matrix.

4. A machine for trimming surplus upper materials from the toe of a shoe containing a last having, in combination, means for supporting the shoe bottom upward, means movable in a path lengthwise of the shoe for trimming the surplus materials, a toe wiper having a beveled trimming matrix surrounding the toe of the shoe movable heightwise thereof, means for moving the toe wiper upward toward the path of the trimming means, first spreading means for spreading portions of the upper materials at the most toeward end of the shoe outward over the matrix, means for causing said first spreading means to clamp the outspread materials against the upward moving matrix and to move upward therewith whereby tension is applied to the upper materials on the last, and second spreading means for spreading outwardly, over the matrix, toe portions of the upper materials at opposite sides of the shoe contiguous with the upper materials spread by said first spreading means.

5. A machine for trimming surplus upper materials from the toe of a shoe having, in combination, means for supporting the shoe bottom upward, a pair of rotatable disk knives movable in a path lengthwise of the shoe and arranged respectively to trim surplus material on each side of the toe portion of the shoe, a matrix on which the materials to be trimmed are supported in outspread condition, means for moving the matrix upward heightwise of the shoe toward the path of the knives, a pair of side spreaders each associated with a knife and operable to swing outwardly around the periphery of its associated knife to spread outwardly, over the matrix, side portions of the toe upper materials overlying the bottom of the shoe, and means for imparting to each knife and its associated side spreader movement lengthwise of the shoe toward the toe end.

6. A machine for trimming surplus upper materials from the toe of a shoe having, in combination, means for supporting the shoe bottom upward, a pair of rotatable disk knives movable in a path lengthwise of the shoe on either side of the center line of the shoe and arranged respectively to trim surplus materials on each side of the toe portion of the shoe, a matrix on which the materials to be trimmed are supported in outspread condition, means for moving the matrix upward heightwise of the shoe toward the path of the knives, a pair of side spreaders each associated with a knife and operable to swing outwardly around the periphery of its associated knife to spread outwardly, over the matrix, side portions of the toe upper materials overlying the bottom of the shoe, means for imparting to each knife and its associated side spreader movement lengthwise of the shoe toward the toe end, and a presser block located between the side spreaders on the center line of the shoe and movable with the knives for pressing down on the upper materials lying on the center line whereby any pleat in the most toeward portions of the upper materials is pressed against the matrix.

7. A machine for trimming surplus upper materials of a shoe containing a last, having, in combination, means for supporting the shoe bottom upwards, means movable in a path lengthwise of the shoe for trimming the surplus materials, a matrix movable heightwise of the shoe into a position in which it supports portions of the upper materials in outspread condition as they are trimmed by the trimming means, means to move the matrix upward, a pair of pivotal toe spreaders, means for pivoting the toe spreaders to spread toe portions of the upper materials outward over the matrix, first force transmitting means for yieldably pressing the toe spreaders against the upward moving matrix whereby, as the matrix moves heightwise of the shoe, the toe spreaders cooperate therewith to stretch the upper materials around the toe portion of the last, a pair of side spreaders, means for moving the side spreaders to spread upper materials on each side of the shoe contiguous with the portions spread by the toe spreaders outwardly over side portions of the matrix, second force transmitting means for yieldably pressing the side spreaders downward against the matrix over successive portions of the upper materials about to be trimmed.

8. A machine for trimming surplus upper materials from a shoe containing a last, having, in combination, means for supporting the shoe bottom upwards, means movable in a path lengthwise of the shoe for trimming the surplus materials, a matrix movable heightwise of the shoe into a position in which it supports portions of the upper materials in outspread condition as they are trimmed by the trimming means, means to move the matrix upward, a pair of pivotal toe spreaders, means for pivoting the toe spreaders for spreading toe portions of the upper materials outward over the matrix, first force transmitting means for yieldably pressing the toe spreaders against the upward moving matrix whereby, as the matrix moves heightwise of the shoe, the toe spreaders cooperate therewith to stretch the upper materials around the toe portion of the last, a pair of side spreaders, means for moving the side spreaders to spread upper materials on each side of the shoe contiguous with the portions spread by the toe spreaders outwardly over side portions of the matrix, second force transmitting means for yieldably pressing the side spreaders downward against the matrix over successive portions of the upper materials about to be trimmed, and a whiffletree associated with the second force transmitting means for balancing the force applied to the upper materials on each side of the shoe when there is a variation in thickness of said upper materials from one side of the shoe to the other.

9. A machine for trimming surplus upper materials from a shoe containing a last having, in combination, means for supporting the shoe bottom upward, means movable in a path lengthwise of the shoe for trimming the surplus materials, a matrix movable heightwise of the shoe into a position in which it supports portions of the upper materials in outspread condition as they are trimmed by the trimming means, a pair of toe spreaders operable to spread toe portions of the upper materials outward over the matrix and thereafter to press them against the matrix whereby, as the matrix moves heightwise of the shoe, the toe spreaders cooperate therewith to stretch the upper materials around the toe portion of the last, and a pair of side spreaders operable to spread the upper materials on each side of the toe contiguous with the portions spread by the toe spreaders outwardly over side portions of the matrix and thereafter to press against the matrix successive portions of the upper materials about to be trimmed.

10. A machine for trimming surplus upper materials from the toe portion of a shoe which is on a last having, in combination, means for supporting the shoe bottom upward, a pair of rotatable disk knives movable in a path lengthwise of the shoe and arranged respectively to trim surplus upper materials on each side of the toe portion of the shoe, a toe wiper surrounding the toe of the shoe and movable heightwise thereof toward the path of the knives and having a beveled trimming matrix located adjacent its upper surface on which the materials to be trimmed are supported in outspread condition, means to move the toe wiper heightwise of the shoe, a pair of side spreaders each associated with a knife and operable to swing outwardly around the periphery of its associated knife to spread outwardly, over the matrix, side portions of the toe upper materials overlying the bottom of the shoe and thereafter to press the side portions against the matrix, a pair of pivotal toe spreaders operable to spread the upper material at the most toeward end of the shoe over the matrix, means to press the toe spreaders yieldingly against the upward moving matrix after the upper material has been spread thereover whereby the toe wiper and the toe spreaders cooperate to stretch the upper material over the last, and means for imparting to each knife and its associated side spreader movement lengthwise of the shoe toward the toe end to trim the surplus material spread over the matrix.

11. A machine for trimming surplus upper materials from the toe of a shoe having, in combination, means for supporting the shoe bottom upward in a fixed operating position, means movable in a path lengthwise of the shoe for trimming the surplus materials, a toe shaping member cooperating with the trimming means and movable heightwise of the shoe comprising, a curved shearing block surrounding the toe of the shoe spaced a distance therefrom when the shoe is supported in the fixed operating position, said shearing block having a flat upper surface, a toe wiper having a wiping surface conforming to the shape of the toe and located between the toe and the curved shearing block, a beveled trimming matrix formed in the upper portion of the toe wiper, means for spreading portions of the upper materials outward over the matrix and the upper surface of the shearing block, and means for moving the toe shaping member including the curved shearing block and the toe wiper upward into the path of the trimming means whereby the outspread portion of the upper materials which extend above the matrix and overlie the flat upper surface of the shearing block are severed from the shoe by the trimming means.

12. A machine for trimming surplus upper materials from the toe of a shoe having in combination a main frame, a sliding head mounted for reciprocation in the frame, means for supporting the shoe bottom upward below the sliding head, a toe wiper surrounding the toe of the shoe movable heightwise thereof and having a beveled trimming matrix located adjacent its upper surface on which the materials to be trimmed are supported in outspread condition, means for moving the toe wiper upward toward the path of the sliding head, means for spreading portions of the upper materials outwardly over the matrix, and trimming means movable with the sliding head comprising a pair of rotatable disk knives each supported in a knife bracket which is adjustably mounted in a knife frame in the sliding head, means for adjusting the knife brackets toward and away from each other within the knife frame, and a rack and pinion mechanism actuated by movement of the sliding head for imparting rotating movement to the knives whereby the knives rotate within the sliding head and move in a path with the head to trim the surplus materials overlying the trimming matrix.

13. A machine for trimming surplus upper materials from the toe of a shoe having in combination means for supporting the shoe bottom upward in a fixed position, means movable in a path lengthwise of the shoe for trimming the surplus materials, a toe shaping member cooperating with the trimming means movable heightwise of the shoe comprising a curved shearing block surrounding the toe of the shoe spaced a distance therefrom and having a flat upper surface, a toe wiper having a wiping surface conforming to the shape of the toe and located between the toe and the curved shearing block, a beveled trimming matrix formed in the upper portion of the toe wiper, means for spreading portions of the upper materials outward over the matrix and the upper surface of the shearing block, and means for adjusting the toe wiper heightwise relative to the shearing block to a position such that the beveled trimming matrix lies just below said flat upper surface to vary the amount of material trimmed from the upper materials supported by the matrix.

14. A machine for trimming surplus upper materials from the toe of a shoe having, in combination, means for supporting the shoe bottom upward, means movable in a path lengthwise of the shoe for trimming the surplus materials, a toe wiper having a beveled matrix on which portions of the upper materials toeward of the tip of the shoe line are supported in outspread condition while being trimmed, means for moving the toe wiper upward toward the path of the trimming means, means for spreading portions of the upper materials outward over the matrix, and a pair of supporting lugs associated with the toe wiper, one at each side of the shoe operable to move inwardly over the shoe bottom and enter folds previously formed in the upper materials in the area of the tip line whereby the lugs support the folded materials while being trimmed.

15. A machine for trimming surplus upper materials from the toe of a shoe having, in combination, means for supporting the shoe bottom upward in a fixed operating position, means movable in a path lengthwise of the shoe for trimming the surplus materials, a toe shaping member cooperating with the trimming means and movable heightwise of the shoe comprising, a curved shearing block surrounding the toe of the shoe spaced a distance therefrom when the shoe is supported in the fixed operating position, said shearing block having a flat upper surface, a toe wiper having a wiping surface conforming to the shape of the toe and located between the toe and the curved shearing block, a beveled trimming matrix formed in the upper portion of the toe wiper, on which portions of the upper materials toeward of the tip line of the shoe are supported in outspread condition while being trimmed, a pair of supporting lugs carried by the toe wiper one on each side of the shoe spring biased to move inwardly over the shoe bottom and enter folds previously formed in the upper materials in the area of the tip line whereby the lugs support the folded materials while being trimmed, means for spreading portions of the upper materials outward over the matrix and the upper surface of the shearing block, and means for moving the toe shaping member including the curved shearing block, the toe wiper and the supporting lugs upward into the path of the trimming means whereby the outspread portion of the upper materials which extend above the matrix and overlie the flat upper surface of the shearing block are severed from the shoe by the trimming means.

References Cited in the file of this patent
UNITED STATES PATENTS

| | | |
|---|---|---|
| 2,260,483 | Roberts | Oct. 28, 1941 |
| 2,315,548 | Schoenky | Apr. 6, 1943 |
| 2,395,874 | Jorgensen | Mar. 5, 1946 |
| 2,556,410 | Barker | June 12, 1951 |